(12) United States Patent
Henry et al.

(10) Patent No.: US 7,975,633 B2
(45) Date of Patent: Jul. 12, 2011

(54) BI-DIRECTIONAL SEAMING MACHINE

(75) Inventors: Brian D. Henry, North Lawrence, OH (US); Rodney M. Tunistra, Phoenix, AZ (US)

(73) Assignee: Miller Weldmaster Corporation, Navarre, OH (US)

( * ) Notice: Subject to any disclaimer, the term of this patent is extended or adjusted under 35 U.S.C. 154(b) by 399 days.

(21) Appl. No.: 12/286,775

(22) Filed: Oct. 2, 2008

(65) Prior Publication Data
US 2009/0320729 A1     Dec. 31, 2009

Related U.S. Application Data

(60) Provisional application No. 61/133,376, filed on Jun. 27, 2008.

(51) Int. Cl.
    *D05B 23/00*      (2006.01)
    *D05B 35/02*      (2006.01)
    *D05B 9/00*      (2006.01)

(52) U.S. Cl. ............... 112/470.12; 112/303; 112/475.08; 112/153

(58) Field of Classification Search .......... 112/117–119, 112/470.09, 470.12, 470.18, 153, 303, 475.01–475.08
See application file for complete search history.

(56) References Cited

U.S. PATENT DOCUMENTS

| | | | | |
|---|---|---|---|---|
| 3,354,850 | A | * | 11/1967 | Story ............................ 112/118 |
| 3,955,515 | A | * | 5/1976 | Elsas ......................... 112/470.18 |
| 4,470,361 | A | * | 9/1984 | Smith ....................... 112/470.12 |
| 4,589,361 | A | * | 5/1986 | Starnes et al. ........... 112/470.05 |
| 4,748,922 | A | * | 6/1988 | Bierbaum et al. ....... 112/470.32 |
| 5,040,473 | A | * | 8/1991 | Zesch et al. .................... 112/117 |
| 5,091,038 | A | | 2/1992 | Greller et al. |
| 5,476,053 | A | * | 12/1995 | Brocklehurst ........... 112/475.06 |
| 5,540,167 | A | * | 7/1996 | Mussig et al. ........... 112/475.09 |
| 5,913,277 | A | * | 6/1999 | Resta ....................... 112/470.12 |

* cited by examiner

Primary Examiner — Ismael Izaguirre
(74) Attorney, Agent, or Firm — Sand & Sebolt

(57) ABSTRACT

A seaming machine for seaming segments of sheet material to one another to form larger sheets includes a frame defining a sheet-receiving area and a pair of spaced seaming devices on opposed sides of the sheet-receiving area for respectively seaming opposed edges of the segments of sheet material to one another. The frame typically defines a table-receiving space for a table to support the sheet segments. The machine provides for the seaming of multiple sheet segments while the sheet segments remain atop the table or another work surface. Relative back and forth movement between the frame and work surface facilitate the process.

33 Claims, 17 Drawing Sheets

BI-DIRECTIONAL SEAMING MACHINE

CROSS REFERENCE TO RELATED APPLICATIONS

This application claims priority from U.S. Provisional Application Ser. No. 61/133,376 filed Jun. 27, 2008; the disclosure of which is incorporated herein by reference.

BACKGROUND OF THE INVENTION

1. Technical Field

The present invention relates generally to seaming machines. More particularly, the invention relates to a seaming machine and method of seaming a number of sheet segments to form a larger sheet of material. Specifically, the invention relates to a bi-directional seaming machine which expedites the process of producing the seams between the sheet segments.

2. Background Information

The seaming together of multiple sheets of material is well known in the art. Typically, a first segment of sheet material is laid on a table or other work surface and a second segment of sheet material is positioned above the first segment with their edges generally aligned so that a seaming device moves along the aligned edges to forms a seam along the length of the two sheet segments. This typically results in a two-segment sheet which is roughly twice as large as each of the individual segments. In order to form larger sheets of material, additional segments of sheet material must be sequentially seamed together. This seaming process may be achieved by various seaming devices depending on the material from which the sheets are formed and the application for which the product will be used. For example, seams may be formed using plastic welders, ultrasonic welders, radio frequency (RF) welders, adhesive or glue seaming devices or sewing devices amongst others.

As will be appreciated, the larger the sheet becomes, the more unwieldy it is to handle. The standard practice for adding one or more additional segments of sheet material to the two-segment sheet is to slide one of the sheets segments off of the table or work surface and move the non-seamed edge of the other sheet segment adjacent the side of the table along which the seaming device is positioned. Especially during the formation of larger sheets of material such as relatively heavy tarps, the movement of these sheet segments and re-positioning thereof can easily require four or more people. Once the non-seamed edge of the second segment of sheet material is properly positioned, a third segment of sheet material is positioned adjacent the second segment and the edges of the second and third segments are then seamed together.

One type of plastic seaming machine utilizes a carriage on which the seaming device and associated structure are mounted so that it can roll back and forth along the edges of sheet material to be seamed together. However, the seaming device is only being used for seaming when the carriage is moving in a single direction. Thus, after seaming two segments of sheet material together, the carriage must be moved from one end of the seam to the other end of the seam in order to seam the next two segments of sheet material together. The relatively slow movement of the carriage back to its starting position is lost time in which no welding occurs. Considering the fact that some seams may be several hundred feet long, this lost time may be considerable. After each segment of sheet material is seamed to the previous one, additional sheet material must be moved off of the table or work surface and gradually piles up on the floor, often in disarray. Furthermore, material hanging off of the table or an elevated work surface pulls on the material atop the table and adds to the difficulty of aligning the material for a subsequent seaming operation. In short, the process is relatively time consuming and labor intensive.

BRIEF SUMMARY OF THE INVENTION

The present invention provides a seaming machine for use with segments of sheet material each having first and second opposed edges, the machine comprising: a frame having first and second ends defining therebetween a longitudinal direction and first and second sides defining therebetween an axial direction; a sheet-receiving area within the frame having first and second axially spaced sides; and first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments.

The present invention also provides a seaming machine comprising: a frame having first and second ends defining therebetween a longitudinal direction and first and second sides defining therebetween an axial direction; first and second axially elongated parallel spools on the frame longitudinally spaced from one another and adapted to respectively carry first and second rolls of sheet material; and first and second seaming devices on the frame axially spaced from one another and longitudinally intermediate the spools.

The present invention further provides a method comprising the steps of: positioning a first segment of sheet material having first and second opposed edges on a generally horizontal work surface; positioning a second segment of sheet material having first and second opposed edges over the first segment with the first and second edges of the second segment respectively adjacent the first and second edges of the first segment; seaming the first and second sheet segments together along their first edges to form a two-segment sheet; positioning a third segment of sheet material having first and second opposed edges over the two-segment sheet with the first and second edges of the third segment respectively adjacent the first and second edges of the second segment and respectively adjacent the first and second edges of the first segment; and seaming the second and third sheet segments together along their second edges to form a three-segment sheet.

BRIEF DESCRIPTION OF THE SEVERAL VIEWS OF THE DRAWINGS

A preferred embodiment of the invention, illustrated of the best mode in which Applicant contemplates applying the principle, is set forth in the following description and is shown in the drawing and is particular and distinctly pointed out and set forth in the appended claims.

FIG. 17 also illustrates the raising of the weld heads, pinch rollers and guide rollers via the height adjustment mechanism in order to accommodate material as it piles up on the table.

Similar numbers refer to similar parts throughout the drawings.

DETAILED DESCRIPTION OF THE INVENTION

Figure 1:
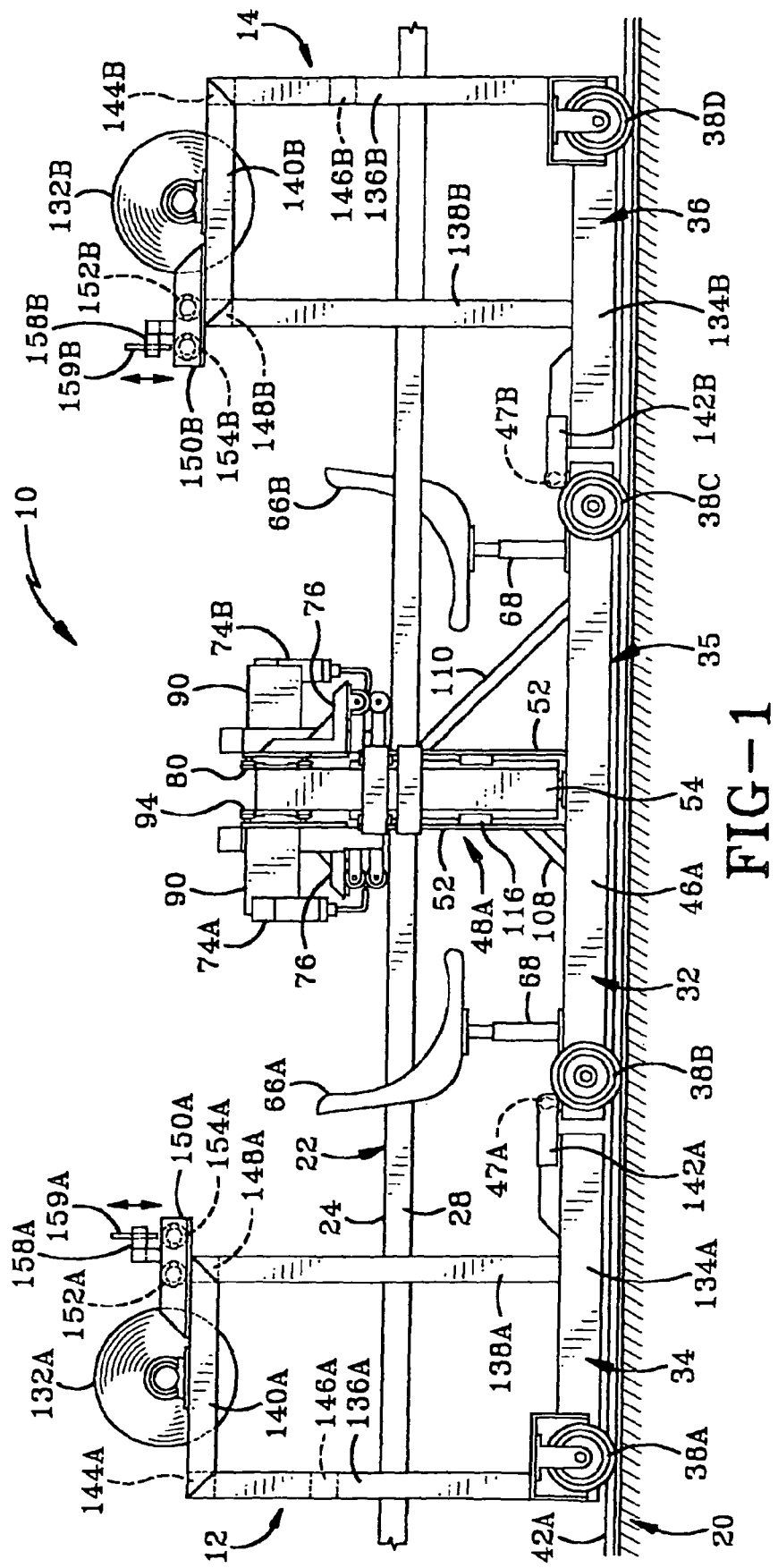
FIG. 1 is a side elevational view of the seaming machine of the present invention with the electronic control boxes removed.
Figure 2:
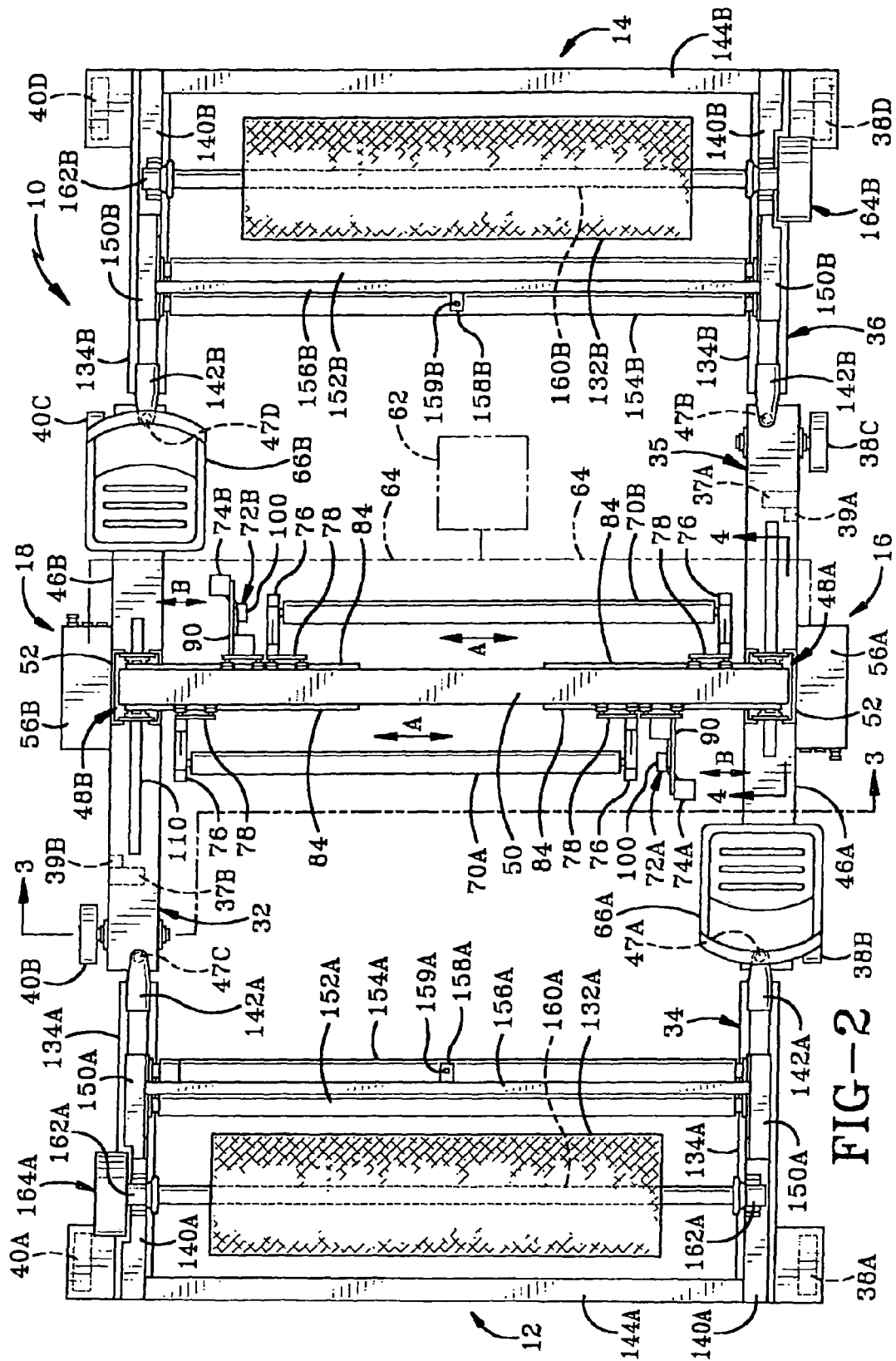
FIG. 2 is a top plan view of the seaming machine.

The bi-directional seaming machine of the present invention is shown generally at 10 in FIGS. 1 and 2. In the exemplary embodiment, machine 10 is shown as a plastic welding machine in which plastic welders are used to form seams between various segments of sheet material. However, machine 10 also represents various other types of seaming machines, such as ultrasonic welding machines, radio frequency (RF) welding machines, adhesive seaming machines, gluing seaming machines and sewing machines. Seaming machine 10 is used to seam together various segments of sheet material to form relatively large sheets of material, such as tarpaulins for covering trailers and the like, tents, playing field covers, construction site covers, fuel storage cells, advertising balloons, pool covers, awnings, pit liners, inflatable buildings and structures, greenhouses, canopies, banners, pond liners, boat shipping covers and various other items.

As shown in FIGS. 1 and 2, machine 10 has first and second ends 12 and 14 defining therebetween a longitudinal direction and first and second sides 16 and 18 defining therebetween an axial direction. Typically, machine 10 is configured to move back and forth in the longitudinal direction in order to alternately weld segments of sheet material together respectively along first side 16 and second side 18 in order to form a welded sheet of material having a length which is increased in the axial direction with the addition of each sheet segment. This is accomplished in the exemplary embodiment as machine 10 rolls back and forth along a floor 20 and sheet material is laid out atop a table 22 having a substantially horizontal table top or work surface 24. While sheet material is typically rolled out on table top 24, floor 20 may also serve as the work surface if an elevated work surface is not needed or desired. A plurality of legs 26 extend downwardly from table top 24 to support top 24 on floor 20 typically in a fixed position, said legs 26 not being shown in FIG. 1 and table 22 not being shown in FIG. 2 for clarity. Instead of a stationary table, table 22 may be provided with wheels 29 which ride on parallel longitudinally extending tracks 31 (FIG. 3) so that table 22 is moveable back and forth in the longitudinal direction relative to machine 10. Table top 24 has first and second parallel longitudinally extending edges 28 and 30 (FIG. 3) which are respectively adjacent and spaced inwardly from first and second sides 16 and 18 of machine 10.

Machine 10 includes a frame or carriage 35 having three primary sections, namely a central section 32 and first and second end sections 34 and 36 connected to opposed ends of central section 32 and extending longitudinally outwardly therefrom respectively toward first end 12 and second end 14. Each of sections 32, 34 and 36 includes a rigid frame. First and second axially spaced sets of wheels 38A-D and 40A-D rollingly support machine 10 respectively on first and second longitudinally extending parallel tracks 42A and 42B (FIG. 3) which are fixedly secured to floor 20 to guide linear movement to machine 10. Wheels 38A and 40A are rotatably mounted on first section 34 adjacent first end 12. Wheels 38D and 40D are likewise rotatably mounted on second section 36 adjacent second end 14. Wheels 38B and 40B are rotatably mounted on central section 32 adjacent one end thereof while wheel 38C and 40C are rotatably mounted on central section 32 adjacent its opposite end.

Figure 3:
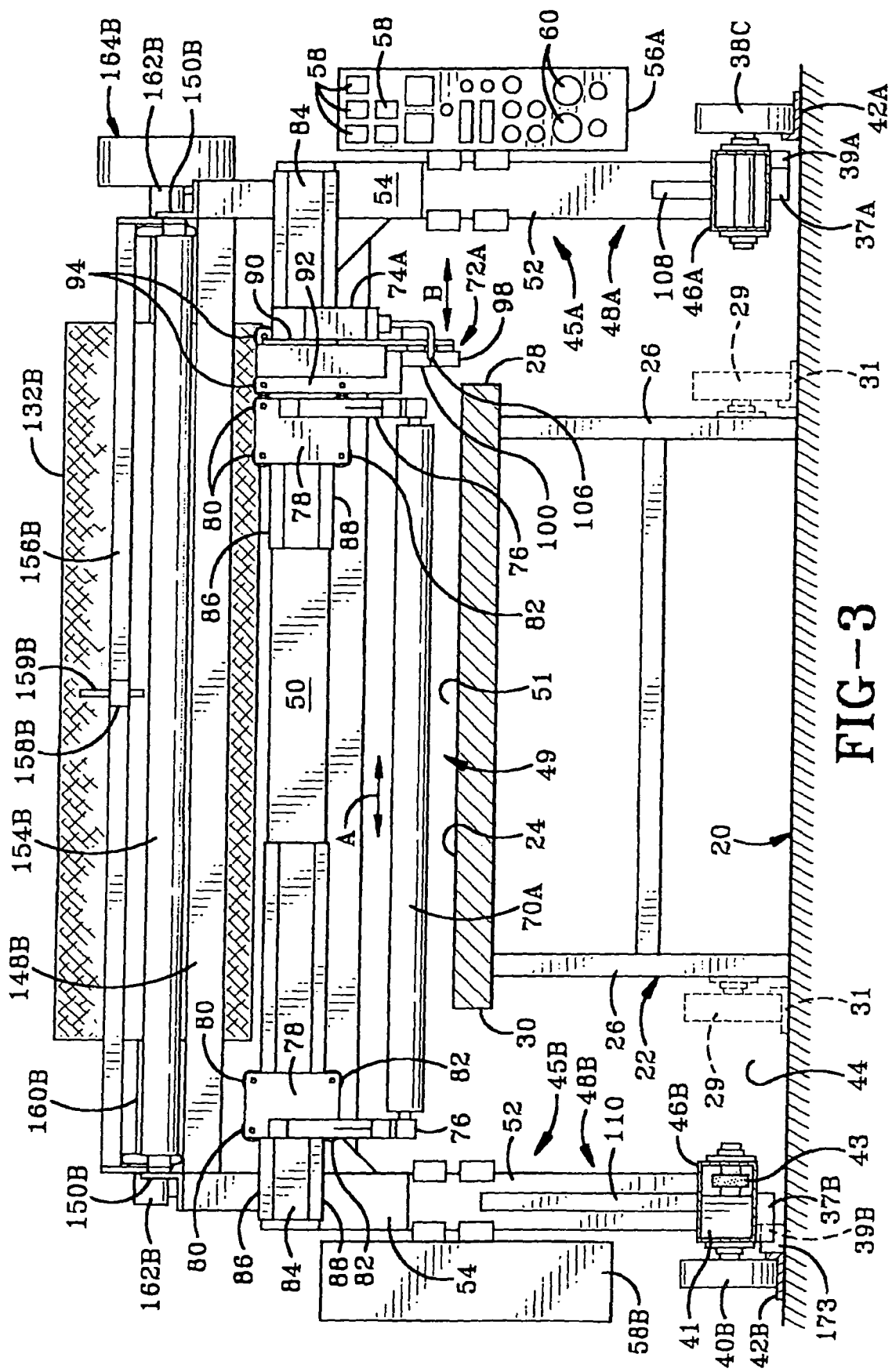
FIG. 3 is a sectional view taken on line 3-3 of FIG. 2.

As shown in FIG. 3, machine 10 when viewed along a longitudinal axis from one of its ends has a generally U-shaped configuration which defines a table-receiving space 44 in which table 22 is disposed and a sheet-receiving space 51 above table top 24. Thus, frame 35 includes first and second spaced side sections 45A and 45B which bound table-receiving space 44 on either side thereof and an elevated section 49 which is connected to an extends between side sections 45 so that elevated section 49 is elevated above table top 24. Thus, the frame of machine 10 extends generally upwardly respectively from first set of wheels 38 and second set of wheels 40 and generally arches over table 22. Spaces 44 and 51 together are thus a tunnel which is open at ends 12 and 14 without obstructions at ends 12 or 14 so that table 22 may be received in the tunnel through either end 12 or 14 as machine 10 moves longitudinally back and forth. As previously mentioned, floor 20 may be used as the work surface and thus machine 10 may be formed so that elevated section 49 is substantially lower than that shown in the exemplary embodiment. In either case, space 51 is positioned between side sections 45A and 45B.

Referring to FIGS. 1-3, central section 32 is now described. Section 32 includes first and second longitudinally extending parallel base beams 46A and 46B which are substantially parallel to tracks 42. Wheels 38B and 38C are mounted via respective axles on beam 46A respectively adjacent opposed ends thereof. Likewise, wheels 40B and 40C are mounted on axles secured to beam 46B respectively adjacent opposite ends thereof. A drive mechanism is mounted on central section 32 for driving the rolling movement of machine 10 back and forth on tracks 42. In the exemplary embodiment, an electric motor 41 (FIG. 3) is mounted on beam 46B for driving rotational movement of wheel 40B. A continuous loop belt 43 (FIG. 3) is disposed within beam 46B to provide a belted drive between wheels 40B and 40C. Thus, wheel 40C (FIG. 2) is driven by belt 43 which is driven by motor 41. While motor 41 is shown within beam 46B, it may be mounted atop beam 46B or any other suitable location. In addition, any suitable drive mechanism may be used. A pair of cut-off switches 37A and 37B (FIGS. 2-3) are mounted respectively on beams 46A and 46B and respectively include switch arms 39A and 39B which are moveable between open and closed circuit positions for respectively opening and closing an electrical circuit in electrical communication with motor 41 and boxes 56.

Four balls 47A-D are mounted respectively on the opposed ends of beams 46A and 46B and extend upwardly therefrom for use in forming a ball hitch connection between central section 32 and each of end sections 34 and 36 as described further below. More particularly, balls 47A and 47B are disposed adjacent the opposed ends of beam 46A while balls 47C and 47D are adjacent the opposed ends of beam 46B. First and second centrally located uprights 48A and 48B extend vertically upwardly respectively from adjacent the midpoints of beams 46A and 46B. Each upright serves as a lift, as described further below. A central cross bar 50 extends axially between and is connected substantially perpendicular to uprights 48A and B adjacent the upper ends thereof. Thus, cross bar 50 extends over table 22 from first upright 48A to second upright 48B, and thus all the way across table top 24 and respectively laterally outwardly of first and second edges 28 and 30, as shown in FIG. 3. Each upright 48 includes a base outer post 52 which is rigidly connected to and extends upwardly from a respective one of beams 46. Each upright 48 also includes an inner post 54 (FIGS. 1, 4) which is telescopically received within outer post 52 and vertically adjustable relative thereto. First and second electronic control boxes 56A and 56B are secured respectively to outer posts 52 of uprights 48A and 48B. Boxes 56 are not shown in FIG. 1 so that inner post 54 of upright 48A and other structure may be more easily seen. Each box 56 includes a plurality of controls 58 typically in the form of switches or buttons along with visible displays 60 which may display, for example, temperature, pressure or other pertinent information. Each box 56 is in electrical communication with an electric power supply 62 via various wires 64. Supply 62 and wires 64 are shown diagrammatically for simplicity and various other electrical connections discussed hereafter may be shown diagrammatically or not shown for the same reason. Swiveling chairs 66A and 66B are mounted respectively on base beams 46A and 46B to provide convenient access to controls 58 and displays 60 of the respective controls boxes 56A and 56B. Each chair 66 includes a back and a seat which is rotatably mounted on a post 68 secured to the respective beam 46. Horizontal cross bar 50 is longitudinally intermediate chairs 66A and 66B and substantially the same normal distance from each of said chairs.

First and second parallel guide rollers 70A and 70B are mounted on opposite sides of cross bar 50, as are first and second sets 72A and 72B of pinch rollers and first and second seaming devices shown here as plastic welders 74A and 74B. More particularly, each of guide rollers 70 is rotatably mounted about a substantially horizontal axially extending axis on a pair of axially spaced L-shaped mounting brackets 76. Each mounting bracket 76 is secured to a wheel plate 78 on which a pair of upper wheels 80 and a pair of lower wheels 82 are rotatably mounted. Four track plates 84 are mounted on opposed sides of cross bar 50 and are generally vertically oriented and axially elongated. Each track plate 84 has an upper track 86 which is rollably engaged by upper rollers 80 and a lower track 88 which is rollably engaged by lower rollers 82 so that each guide roller 70 is rollably mounted for horizontal adjustment back and forth in the axial direction as indicated at Arrows A in FIGS. 2 and 3.

Figure 4:
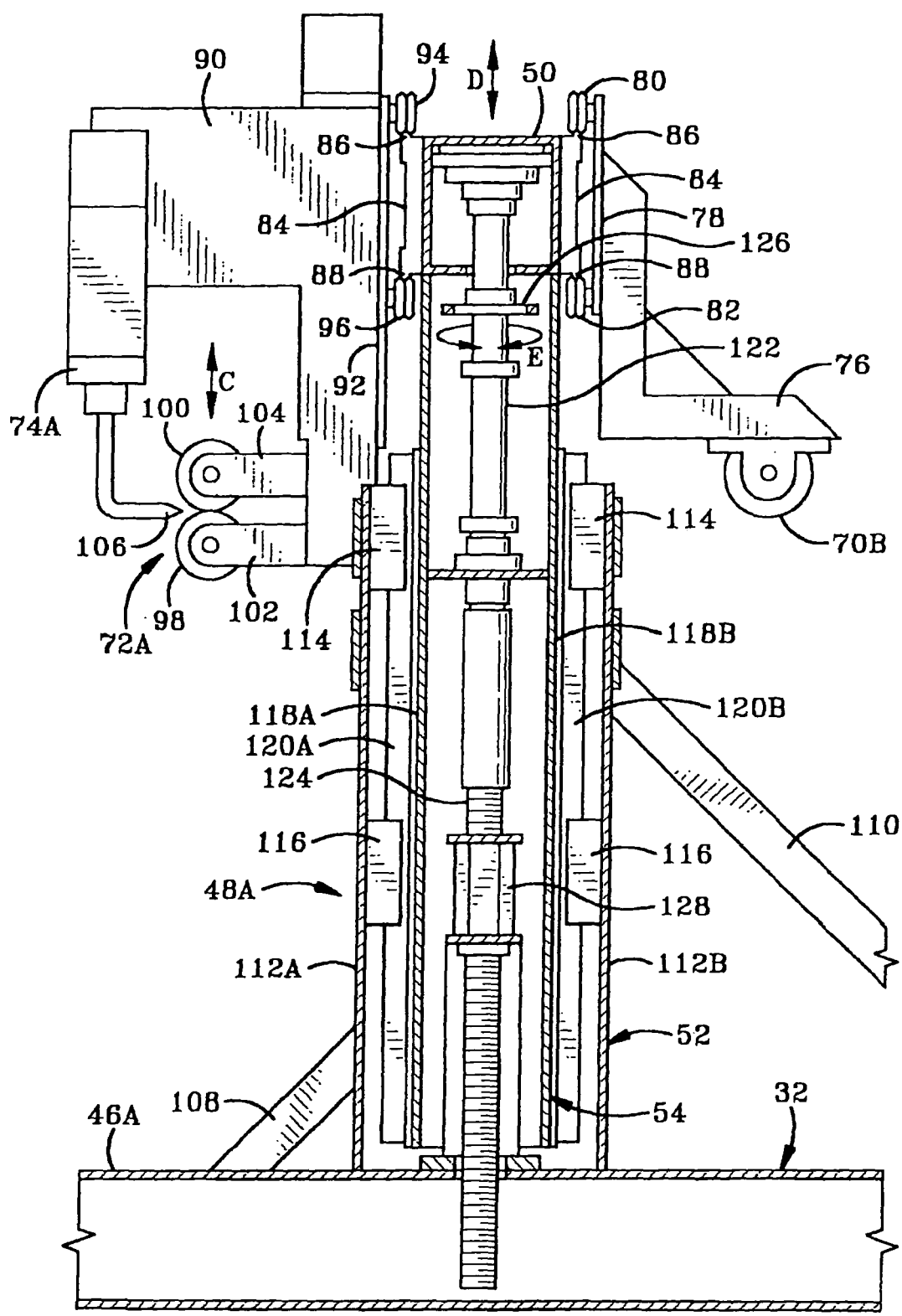
FIG. 4 is a sectional view taken on line 4-4 of FIG. 2.

Similarly, each set 72 of pinch rollers and each associated welder 74 is horizontally moveable as indicated at Arrows B in FIGS. 2 and 3 via a similar axial adjustment mechanism. More particularly, as shown in FIG. 2-4, each set 72 of pinch rollers and the respective welder 74 is mounted on a mounting bracket 90 which is secured to a track plate 92 on which a pair of upper wheels 94 and a pair of lower wheels 96 are rotatably mounted to respectively rollably engage upper track 86 and lower track 88. As shown in FIG. 4, each set 72 of pinch rollers includes a lower roller 98 and an upper roller 100 which are rollably engagable with one another. Lower roller 98 is rotatably mounted on a lower arm 102 rigidly secured to mounting bracket while upper roller 100 is rotatably mounted on an upper arm 104 which is moveably mounted on bracket 90 so that upper roller 100 is moveable up and down as indicated at Arrow C in FIG. 4 relative to lower roller 98, which allows roller 100 to move in and out of contact with roller 98 and apply a desired amount of pressure on lower roller 98 and on sheet material passing between rollers 98 and 100. As seen in FIGS. 2 and 3, each upper roller 100 is adjacent and axially spaced from one end of a respective guide roller 70 and rotates about a horizontal axis which is the same as or adjacent the axis about which the guide roller rotates. As seen in FIGS. 3 and 4, each welder 74 has a welding tip or head 106 which is longitudinally spaced from and adjacent a respective set 72 of pinch rollers. Welding head 106 may be for example a metal head or wedge which is electrically heated by resistance, a tubular structure through which heated air may blow or any other suitable configuration for welding plastic material. Thus, each welder 74 includes a heat source or heat-producing mechanism. Commonly, each welder 74 is thus a hot wedge or hot air welder. Thermal bars or bands may also be used. Further, while each of these seaming devices is shown in the exemplary embodiment as plastic welder, each welder 74 also represents an ultrasonic welder, a radio frequency (RF) welder, an adhesive seaming device, a gluing seaming device, a sewing device or any other suitable seaming device which is typically in electrical communication with boxes 56 and power supply 62 (FIG. 2).

With reference to FIG. 4, lift or upright 48A is described in greater detail. Lift 48B is the same as lift 48A. As previously noted, lift 48A includes an outer post 52 which is rigidly secured to rigid beam 46A and extends upwardly therefrom. Lift 48A further includes an inner post 54 which is vertically adjustable as indicated at Arrow D in FIG. 4 so that cross bar 50 and the various components attached thereto are likewise vertically moveable up and down to provide a height adjustment mechanism. Shorter and longer angle supports 108 and 110 angle downwardly in opposite directions from outer post 52 and are secured to beam 46A to provide addition stability to post 52. Outer post 52 includes first and second longitudinally spaced side walls 112A and 112B. A pair of axially spaced upper guide blocks 114 is connected to and extend inwardly respectively from each of side walls 112A and 112B (FIGS. 2 and 4). Likewise, a pair of axially spaced lower guide blocks 116 are vertically aligned below the respective upper guide blocks 114 extend inwardly from each of walls 112A and 112B. Inner post 54 includes first and second longitudinally spaced side walls 118A and 118B. A pair of vertically extending fins 120A and 120B are connected respectively to and extend outwardly from side walls 118A and 118B and are respectively received between the spaced upper guide blocks 114, as best seen in FIG. 2. Thus, fins 120A and B are slidably received between the respective pairs of upper guide blocks 114 and the respective pairs of lower guide blocks 116, which provide guide surfaces to guide the vertical movement of inner post 54. Lift 48A includes a lift mechanism which includes a vertically extending shaft 122 having a lower externally threaded portion 124 and a drive member in the form of a sprocket 126. Sprocket 126 may be driven by a chain in order to rotate shaft 122 as indicated at Arrow E in FIG. 4. An electric motor (not shown) may be provided in electrical communication with boxes 56 and power supply 62 for driving the chain and sprocket 126. Threaded portion 124 threadedly engages an internally threaded collar 128 which is rigidly connected to beam 46A by an extension 130. Thus, shaft 122 may be rotated in opposing directions so that the threaded engagement between portion 124 and collar 128 respectively raises and lowers inner post 54, cross bar 50 and the various attachments thereto including guide rollers 70, sets 72 of pinch rollers and welders 74. Other suitable height adjustment mechanisms may be used.

Referring again to FIGS. 1 and 2, first and second end sections 34 and 36 are now described. Because sections 34 and 36 are substantially identical to one another, the description will focus on section 34. In the drawings the reference numbers corresponding to the various elements of sections 34 and 36 will end respectively in the letters A and B although in the present text they may be referred to using only the reference numeral for simplicity. Section 34 adjacent each of first and second sides 16 and 18 includes a horizontal longitudinally extending base beam 134, first and second uprights 136 and 138 connected to and extending upwardly from base beam 134, and a horizontal upper beam 140 connected to and extending between the upper ends of uprights 136 and 138 to form a substantially rectangular configuration.

Base beam 134 is aligned in an end to end fashion with and parallel to base beam 46A of central section 32. Wheel 38A is mounted on base beam 134 adjacent one end thereof near first end 12 of machine 10. A socket member 146 is connected to beam 134 at the end opposite wheel 38 and extends upwardly and longitudinally outwardly therefrom to receive a respective one of balls 47 to provide a removable connection between end section 34 and central section 32. Section 34 is thus mounted like a trailer to central section 32 so that section 32 is the driving portion of the carriage and section 34 is the towed portion of the carriage which is pushed and pulled back and forth along tracks 42 by central section 32. Other connections or connection mechanisms may be used in place of the ball hitch configuration. In addition, section 34 may be permanently connected to central section 32 if desired. However, the removable aspect allows for easier access during maintenance of the various components as well as for the formation of the relatively large machine 10 using smaller components for the respective base beams and so forth. A first cross bar 144 extends from the rectangular structure of section 34 on first side 16 to the rectangular structure on second side 18. More particularly, first cross bar 144 is connected to each of these rectangular structures at the intersection of vertical upright 136 and horizontal upper beam 140. A second horizontal axially extending cross bar 146 extends parallel to first cross bar 144 directly there below and is connected to the respective uprights 136 of each of the rectangular structures on either side of section 34. A mounting bracket 150 is connected atop each upper beam 140 and extends outwardly therefrom toward central section 32. A pair of parallel support rollers 152 and 154 extends horizontally and axially between the brackets 150 on each side of section 34 and are rotatably supported thereon by respective bearings at either end of the rollers about substantially horizontal axially extending parallel axes. Rollers 152 and 154 are spaced longitudinally a short distance from one another.

A fourth cross bar 156 which is smaller than the previously noted cross bars is connected to mounting brackets 150 and extends axially therebetween parallel to rollers 152 and 154 above the space therebetween. A sheet material securing device 158 is mounted on cross bar 156 axially midway between mounting brackets 150 above roller 154 and includes a finger 159 movable up and down between a raised released position and a lowered securing position for respectively releasing and securing sheet material unrolled from roll 132 via a relative low pressure clamping action between finger 159 and roller 154. Device 158 includes an actuating mechanism such as an air cylinder for moving finger 159 from the raised to the lowered position against sheet material 168. An axially elongated spool or rod 160 is spaced from and extends parallel to rollers 152 and 154 and is rotatably mounted via a pair of axially spaced bearing brackets 162 mounted atop beam 140. Spool 160 is received through the center of roll 132 so that roll 132 is wound around spool 160. A spool control 164 is mounted on one end of spool 160 for controlling the rate of rotation of spool 160 and thus the unwinding of roll 132 during operation. Spool control 164 includes a brake for slowing or stopping the rotation of spool 160 and a fan for cooling the brake.

As previously noted, each of sections 34 and 36 is substantially identical. In addition, section 32 is formed of two substantially identical portions on either side of a vertical axially extending plane cutting through cross bar 50. Thus, analogous components of machine 10 on either side of cross bar 50 are typically equidistant from cross bar 50 on either side thereof. Thus, rollers 70A and 70B are substantially equal normal distances from cross bar 50, as are sets 72A and 72B of pinch rollers, welders 74A and 74B, rollers 154A and 154B, rollers 152A and 152B, spools 160A and 160B, spool controls 164A and 164B and rolls 132A and 132B when mounted on the respective spools. Various other components of machine 10 are likewise spaced normal distances which are equal to one another on opposed sides of cross bar 50, as is evident from the drawings.

Figure 5:
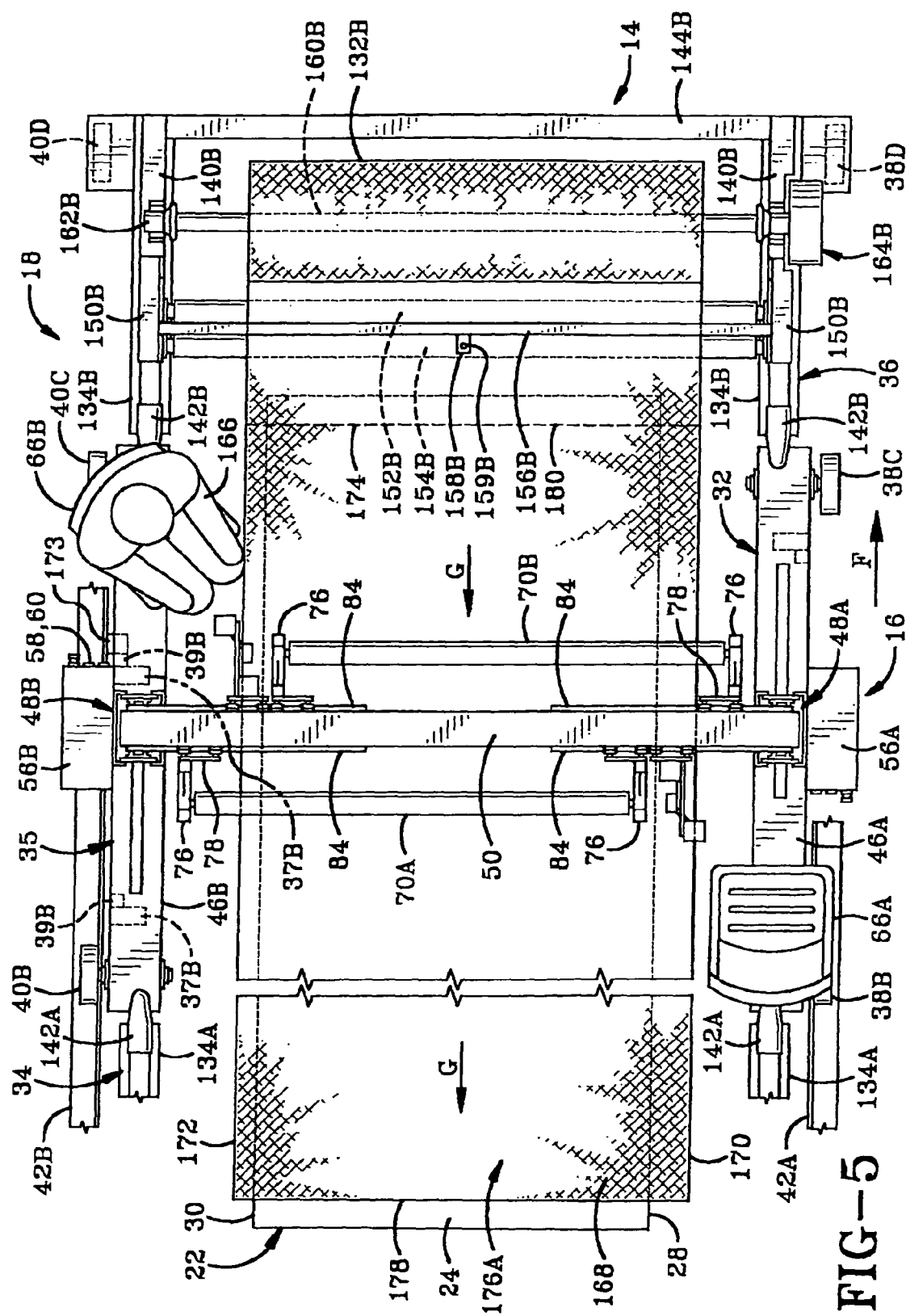
FIG. 5 is a top plan view with portions cut away of the seaming machine showing material unwinding from one roll as the machine moves in a first direction.

The operation of machine 10 is now described with reference to FIGS. 5-18. Depending on the width of sheet material 168 on a given roll 132 and its specific position on spool 160, guide rollers 70, pinch rollers 72 and welders 74 may be axially adjusted via wheels 80 and 82 in order to properly position them for the seaming or welding process (Arrows A and B in FIG. 2). In addition, the ability to axially adjust mounting brackets 76 facilitates the removal and replacement of guide rollers 70 with guide rollers of different lengths suitable to the width of a given roll of sheet material 168. Once this preliminary setup is complete, an operator 166 is seated in chair 66B along second side 18 of machine 10, as shown in FIG. 5. Chair 66B is located at a work station or operator station which provides convenient manual access to controls 58 and visual access to displays 60 on box 56B. Chairs 66 serve as operator supports which may alternately be standing platforms on frame 35. Operator 166 may swivel chair 66B to face box 56B or to face toward side 16 of machine 10 or at any desired angle. Operator 166 typically operates controls 58 in order to simultaneously roll carriage 35 along tracks 42 in a first longitudinal direction (Arrow F) and unroll sheet material 168 from roll 132B so that material 168 is effectively unrolling in the opposite direction (Arrows G) to lay on table top 24 in sheet-receiving space 51 (FIG. 3). More particularly, motor 41 (FIG. 3) is operated via controls 58 to move machine 10. Alternately, machine 10 may remain stationary and table 22 may be moved longitudinally via wheels 29 on tracks 31 (FIG. 3). When this is the case, table 22 moves in the direction shown at Arrows G along with the unrolling of sheet material 168. First and second opposed edges 170 and 172 of sheet material 168 respectively overhang edges 28 and 30 of table top 24 as material 168 is unrolled. Typically, the brake of spool control 164B, which is in electrical communication with control box 56B, is operated to control the rate of rotation of roll 132B with spool 160B to unwind sheet material 168. If deemed necessary, operator 166 may place a weight or otherwise secure sheet material 168 atop table 22 to hold material 168 in place as it unwinds from roll 132B, although this is typically not necessary. With continued reference to FIG. 5, when an appropriate length of sheet material 168 has been unwound from roll 132B and lies atop table 22, cut-off switch 37B is activated by a switch activating device or stop 173 which is typically mounted on track 42B. Typically, stop 173 is a device which is clamped onto the upstanding portion of track 42B or is magnetically attached thereto. However, stop 173 may be positioned at any location adjacent the pathway along which machine 10 travels in order to activate a switch like switch 37B mounted somewhere on machine 10. Switch 37B is shown in FIG. 5 at two locations which are to the left and right of one another. The left location illustrates the position corresponding to the location of machine 10 in FIG. 5. The right location illustrates the position of switch 37B in contact with stop 173 as would be the case when machine 10 reaches the end of its travel. Stop 173 is selectively securable at any location along track 42B and is thus longitudinally moveable in order to pre-set the length of material 168 which is to be used during the operation. Operator 166 will have positioned stop 173 prior to the movement of carriage 35 and unwinding of sheet material 168. Stop 173 may be secured at any position generally along tracks 42 to activate switch 37B by moving switch arm 39B, typically to the open circuit position in order to cut off power to motor 41 (FIG. 3) to automatically stop the rolling movement of carriage 35. Once the desired length of sheet material 168 for the process is unwound from roll 132B, it is cut at a cut line 174 to form a first sheet segment 176A having first and second ends 178 and 180.

Figure 6:
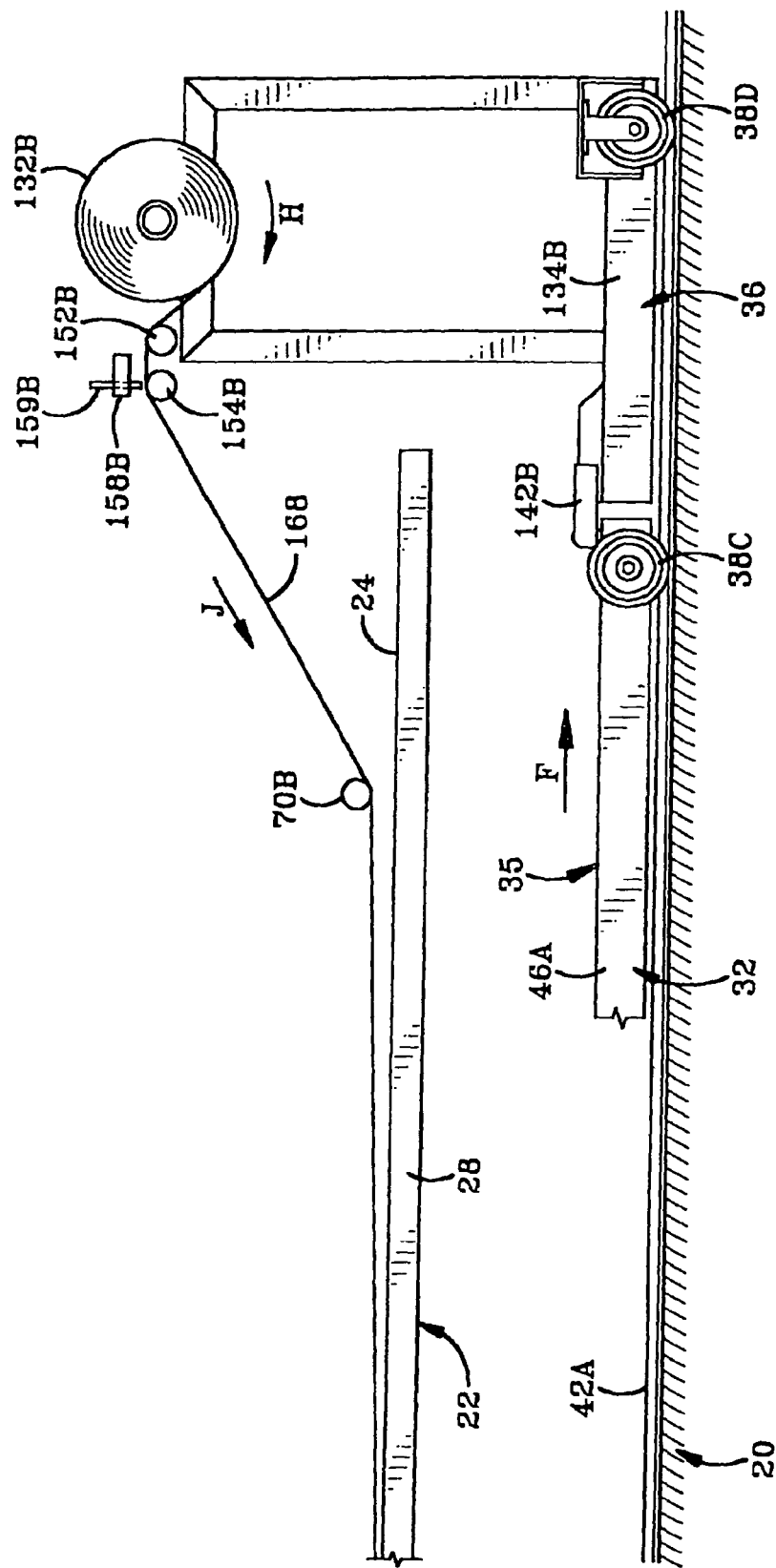
FIG. 6 is a side elevational view with portions cut away showing the same operation as FIG. 5.

As shown in FIG. 6, sheet material 168 during this process is unwound from the bottom of roll 132B (Arrow H) over and in engagement with support rollers 152B and 154B and below securing device 158B and cross bar 156B. Sheet material 168 then angles downwardly from roller 152B (Arrow J) below and in engagement with guide roller 70B and beyond roller 70B to lie atop table top 24. Preferably, finger 159B of securing device 158B is then moved downwardly so that finger 159B and roller 154B secure therebetween the portion of sheet material 168 which is connected to and extends from roll 132B after sheet segment 176A is cut therefrom. The portion of sheet material 168 thus secured by finger 159B thus remains in position for subsequent use.

Once first sheet segment 176A is laid on table top 24, operator 166 vacates chair 66B, walks around machine 10 to side 16 and sits down in chair 66A (FIG. 7) to control operation of machine 10 via box 56A. A certain amount of sheet material 168 is unrolled from roll 132A so that a free end 182 thereof is aligned with second end 180 of first sheet segment 176A. The sheet material 168 from roll 132A has first and second edges 184 and 186 which respectively overlap and are adjacent first and second edges 28 and 30 of table top 24. However, while first edge 184 extends outwardly beyond first edge 28 of table top 24, it does not extend as far outwardly as does first edge 170 of first sheet segment 176A since rolls 132A and 132B are axially offset relative to one another a short distance. Thus, second edge 186 extends outwardly further than or overlaps second edge 172 of first sheet segment 176A since the sheet material from each of rolls 132A and 132B have the same width. Because the material 168 unwinding from roll 132A is not greatly offset from sheet segment 176A, edge 184 and 186 are still respectively adjacent edges 170 and 172. It is noted at this point that rolls 132A and 132B may or may not be offset from one another depending on the specific type of seam to be formed. In the exemplary embodiment, the final seam which is formed is a fold-over lap seal or seam, for which the offset between the rolls is appropriate.

Figure 7:
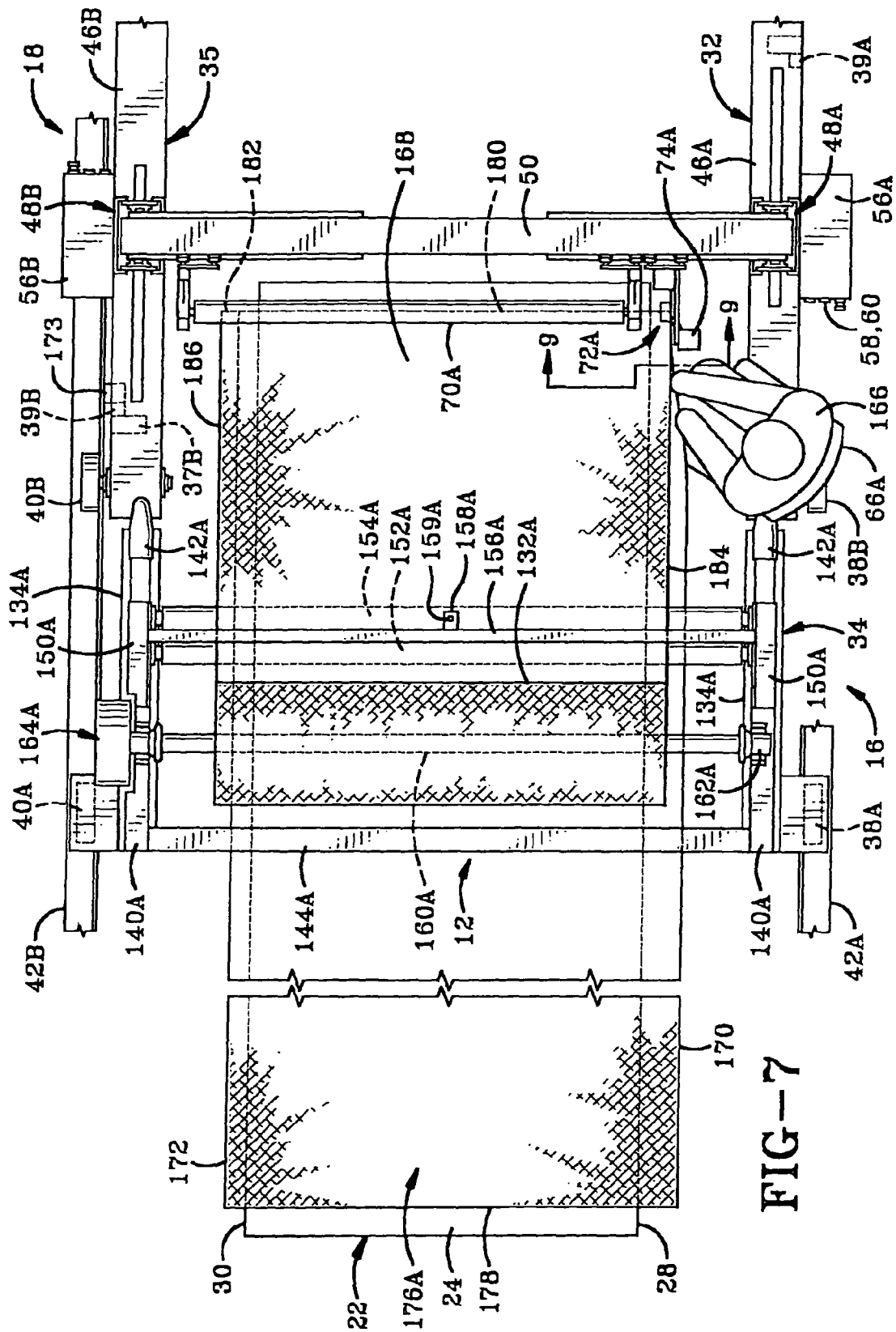
FIG. 7 is a top plan view with portions cut away showing sheet segments unwinding from the other roll and the initial stage of the seaming operation as the machine is prepared to move in the opposite direction with the operator on the opposite side from that shown in FIG. 5.
Figure 8:
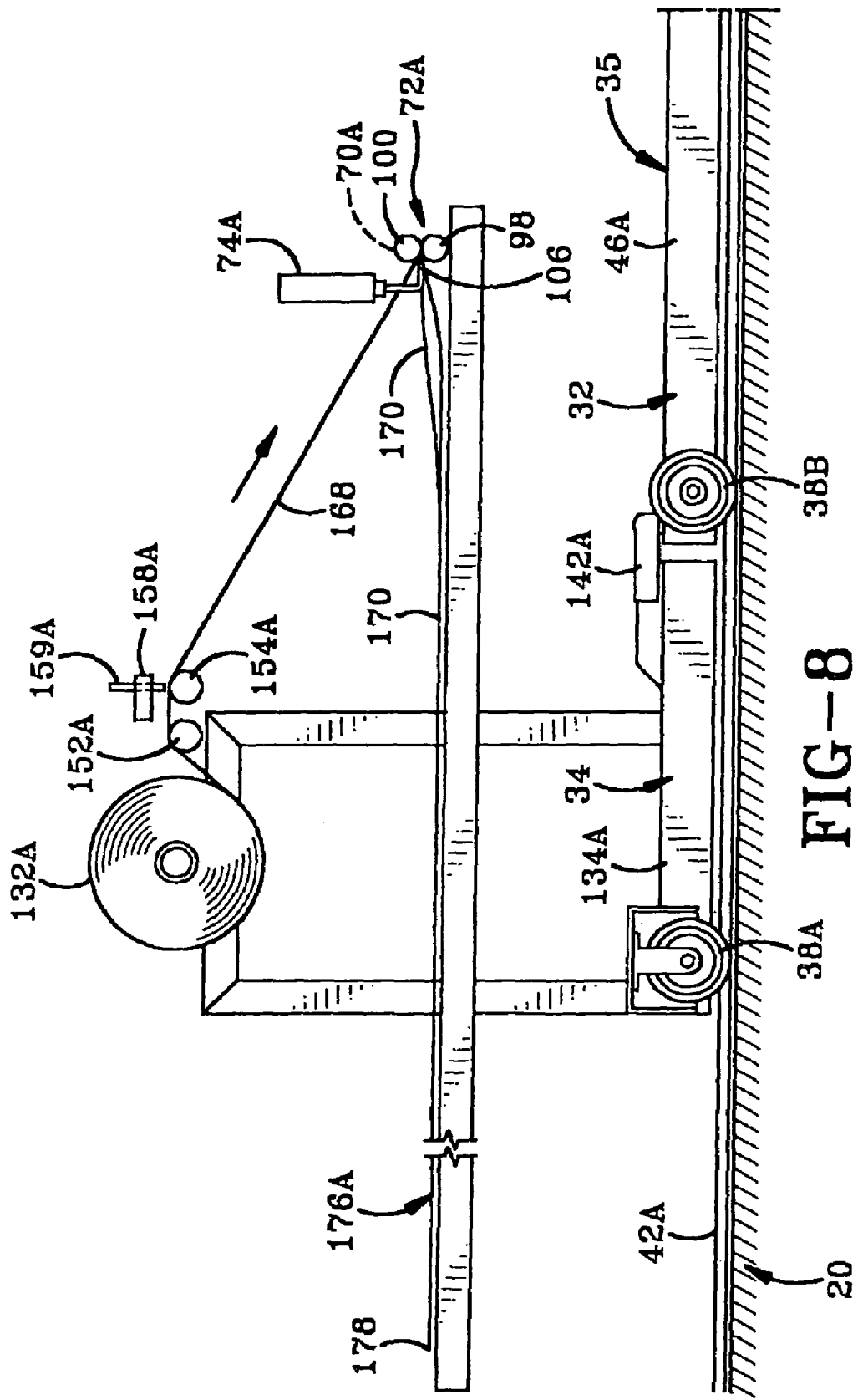
FIG. 8 is a side elevational view with portions cut away showing the same operation as FIG. 7.
Figure 9:
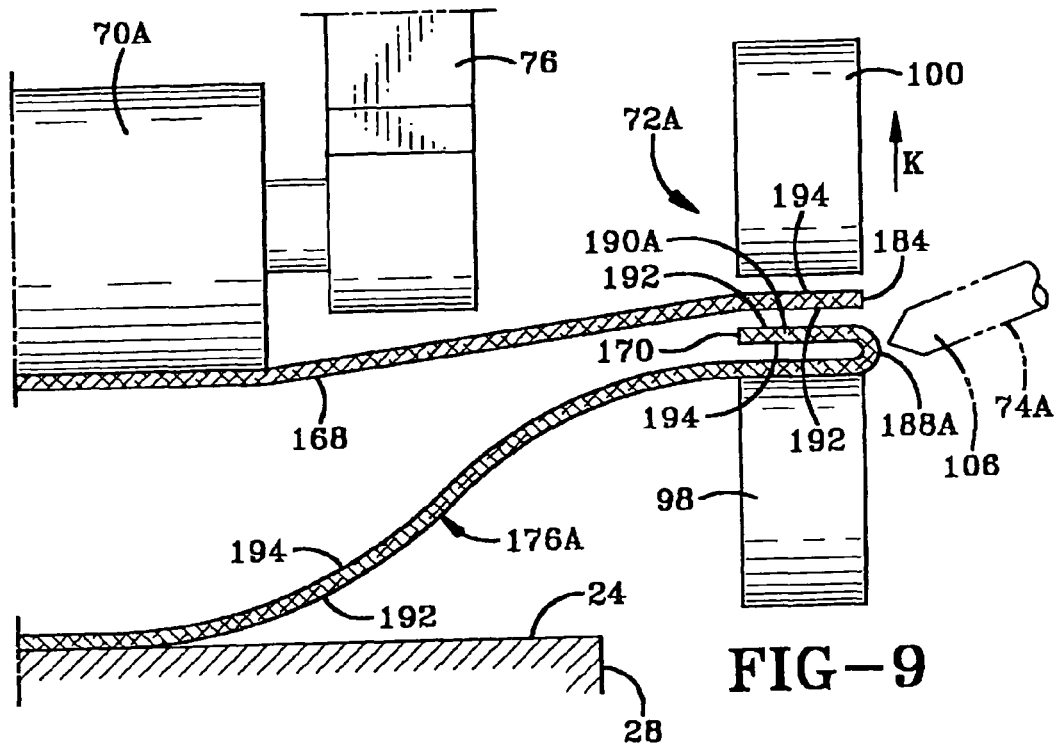
FIG. 9 is a sectional view taken on line 9-9 of FIG. 7 showing one set of the pinch rollers and one of the welding heads just prior to the beginning of the welding operation.
Figure 10:
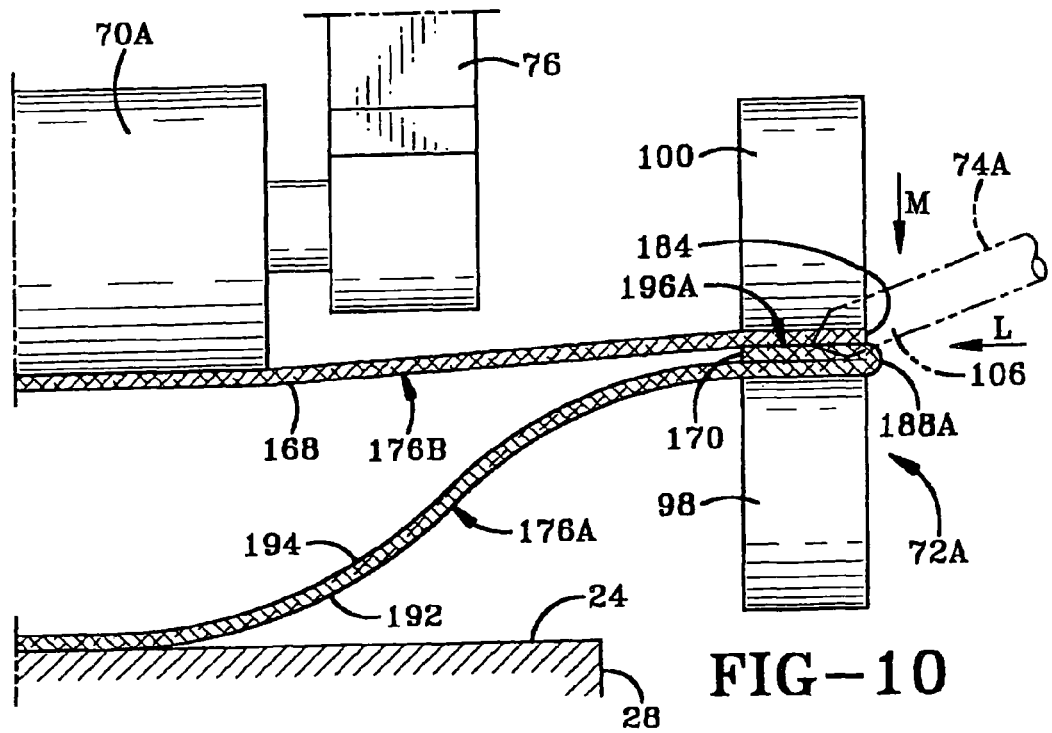
FIG. 10 is similar to FIG. 9 and shows the pinch rollers pinching the edges of the sheet segments and the beginning of the welding operation.
Figure 11:
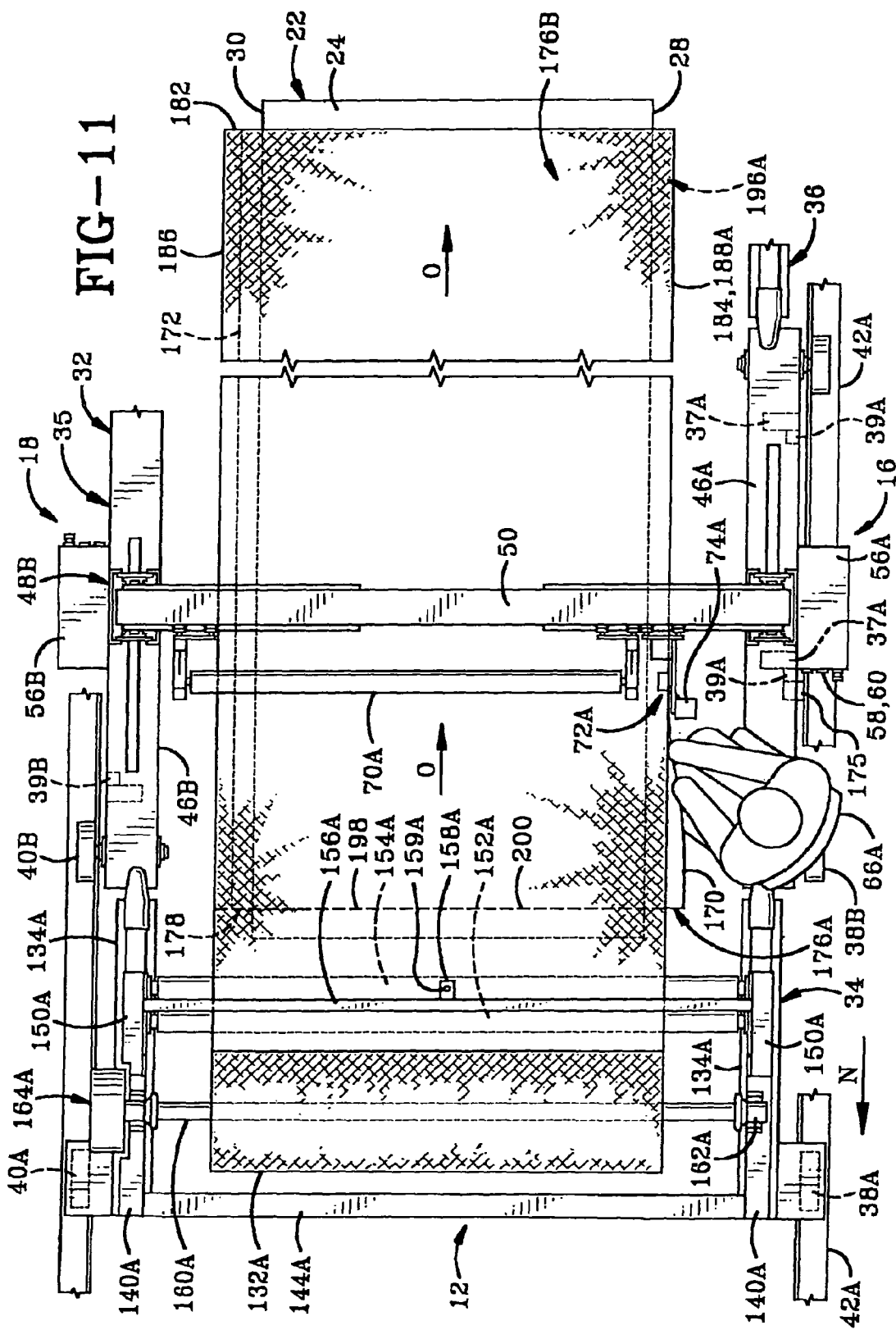
FIG. 11 is a top plan view of the machine with portions cut away showing the movement of the machine in the direction opposite that of FIGS. 5 and 6 as the welder on one side of the machine welds the sheet segments together along one side of the machine.

Referring to FIGS. 7-9, operator 166 then manipulates sheet segment 176A along first edge 170 to fold it over on itself and align the folded portion beneath the sheet material being unwound from roll 132A adjacent first edge 184 thereof. Operator 166 also aligns the folded portion of sheet segment 176A between pinch rollers 98 and 100 as shown best in FIG. 9. To facilitate this alignment pinch roller 100 may be moved upwardly as indicated Arrow K in FIG. 9. This folding process thus creates a first fold 188A of first sheet segment 176A with a folded edge segment 190A which is folded over a portion of segment 176A adjacent fold 188A. Amongst many other possibilities discussed further below, sheet material 186 may be a heavy duty tarpaulin material which includes a weldable thermoplastic layer 192 (FIG. 9) and a non-weldable layer 194. In the exemplary embodiment sheet material 168 is unrolled from the respective rolls 132 so that weldable plastic layer 192 faces downwardly and non-weldable layer 194 faces upwardly. Thus, when operator 166 folds over the material at fold 188A, folded edge segment 190A is inverted so that plastic layer 192 of segment 190A faces upwardly and non-weldable layer 194 of segment 198 faces downwardly. Thus, the only suitable weld location between sheet segment 176A and the sheet material being unrolled from 132A is between the plastic layer 192 of segment 190A and the portion of plastic layer 192 adjacent edge 184 of the unrolling material. When the material is appropriately folded and positioned, welding head 106 is heated and positioned (Arrow L in FIG. 10) to weld the noted layers 192 together and upper pinch roller 100 is moved downwardly (Arrow M) to press the sheet material being welded between upper and lower rollers 100 and 98. This pressure assures a good weld seam at 196A (FIG. 10).

Figure 12:
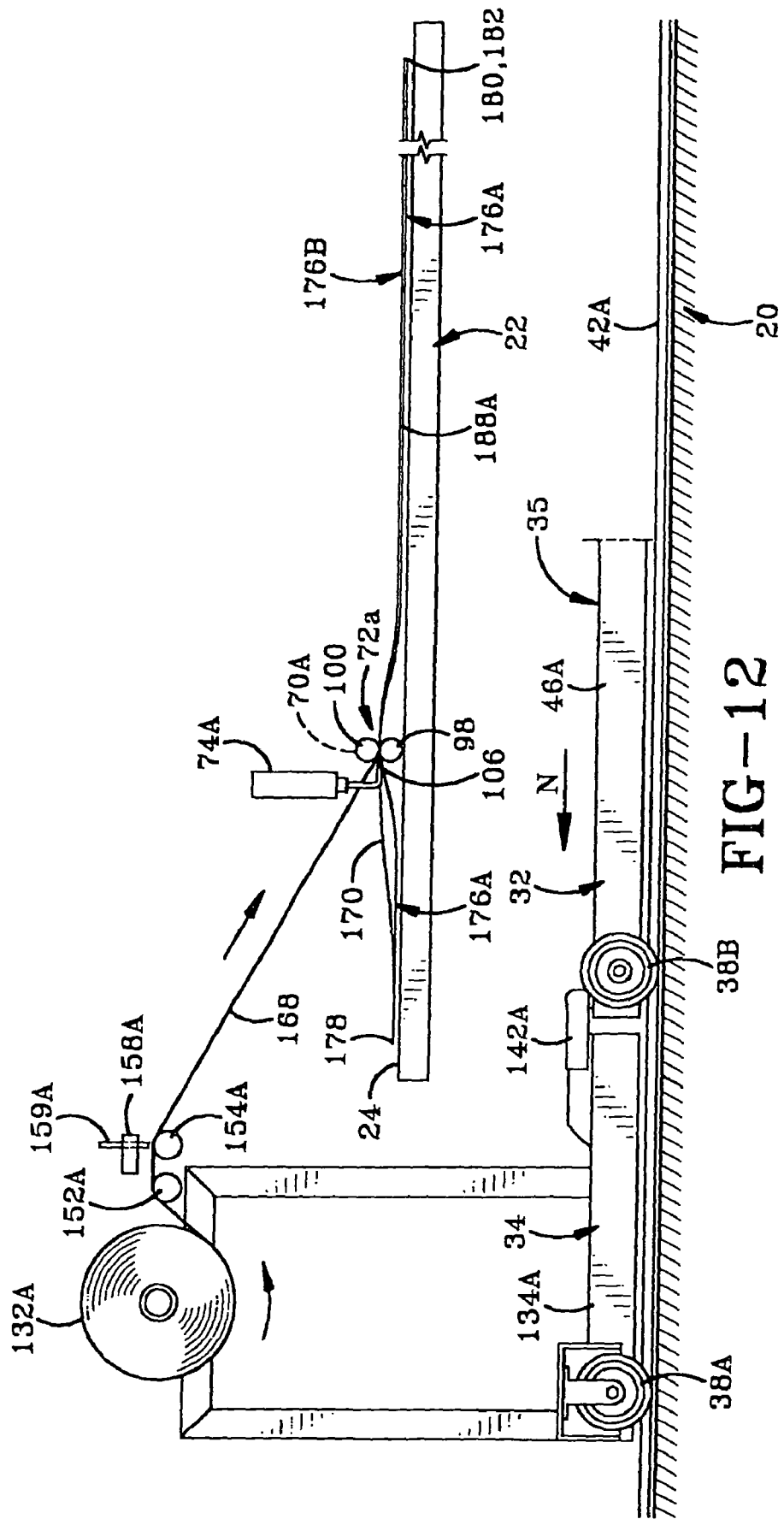
FIG. 12 is a side elevational view with portions cut away showing the same operation as FIG. 11.
Figure 13:
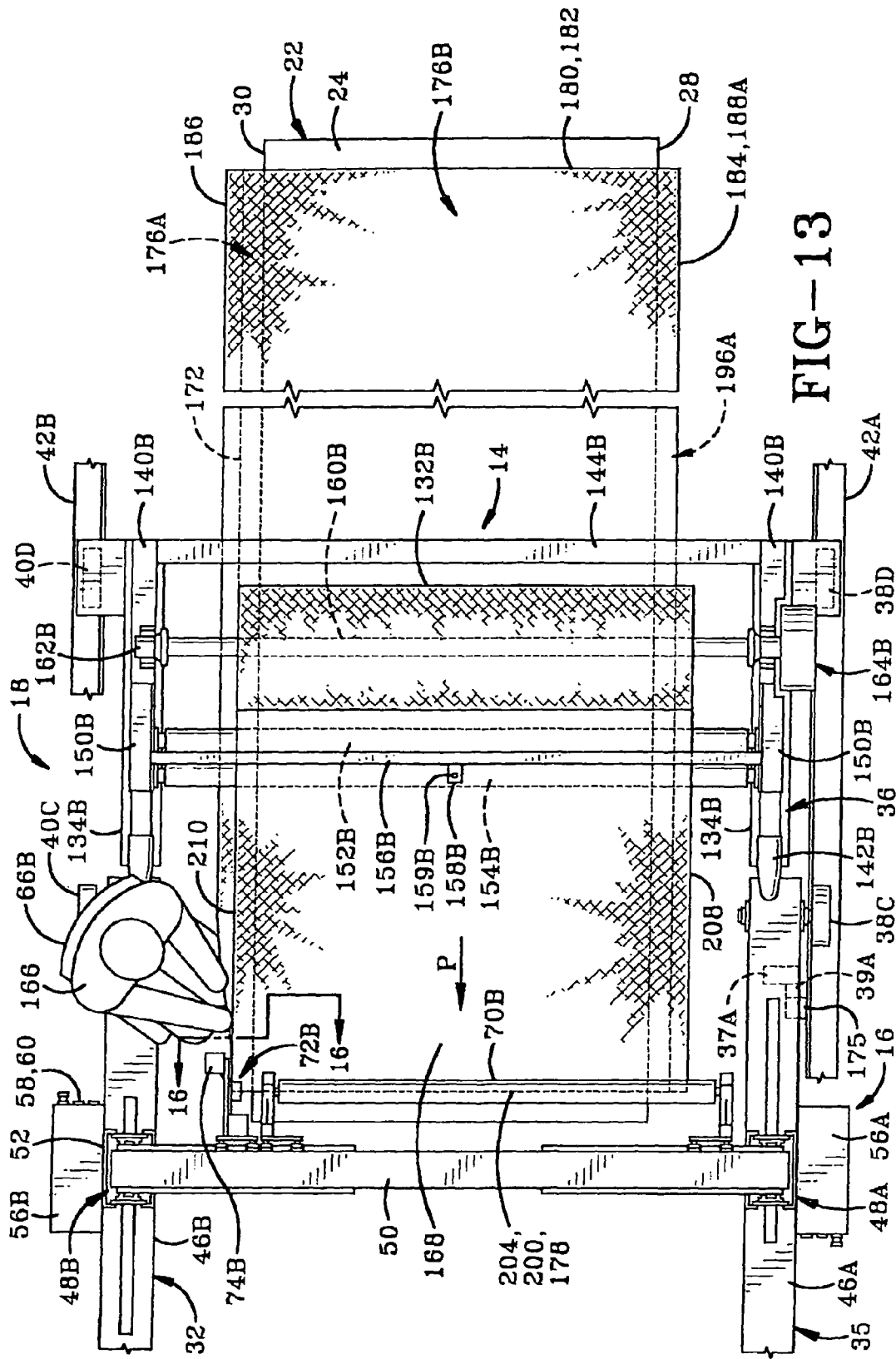
FIG. 13 is a top plan view with portions cut away and the operator on the other side of the machine showing a third sheet segment being unrolled from the first roll atop the first and second sheet segments and just prior to the beginning of the welding of the second and third sheet segments.

To complete weld seam 196A along the entire length of sheet segment 176A, operator 166 via controls 58 of box 56A activates the rolling movement of carriage 35 in a direction (Arrow N in FIG. 11) which is opposite that shown in FIG. 5. Simultaneously, sheet material 168 unwinds from roll 132A (Arrows O in FIG. 11) under appropriate tension due to the brake of spool control 164A while operator 166 continues to fold sheet segment 176A over along edge 170 thereof until the folding and welding procedure continues all the way to first end 178 of first sheet segment 176A. When a suitable length of sheet material 168 is unrolled from roll 132A, switch arm 39A of switch 37A engages a second stop 175 mounted along track 42A to automatically stop the rolling movement of carriage 35 in the direction of Arrow N. Switch 37A is shown at two locations in FIG. 11 in the same manner that switch 37B was shown in FIG. 5, as discussed above. Sheet material 168 is then cut at a cut line 198 in order to form a second sheet segment 176B having ends 182 and 200. End 200 is aligned directly above first end 178 of sheet segment 176A. As shown in FIG. 12, sheet material 168 during this process is unrolled from the bottom of roll 132A over support rollers 152A and 154A and below securing device 158A, and then angles downwardly beneath guide roller 70A and between pinch roller 98 and 100 of set 72A. Finger 159A of device 158A is then moved to lightly press sheet material 168 extending from roll 132A to support roller 154A to hold this flap of sheet material 168 in position for subsequent use. Guide roller 70A helps to guide material 168 as it unrolls from roll 132A so that edge 184 is disposed between pinch rollers 98 and 100 of set 72A. When this first stage of the welding process is finished, welded seam 196A extends along the entire length of each of sheet segments 176A and 176B. Edge 186 of sheet 176B still extends outwardly beyond and adjacent edge 172 of sheet segment 176A, as shown in FIG. 13. In addition, fold 188A overhangs first edge 28 of table top 24.

Figure 14:
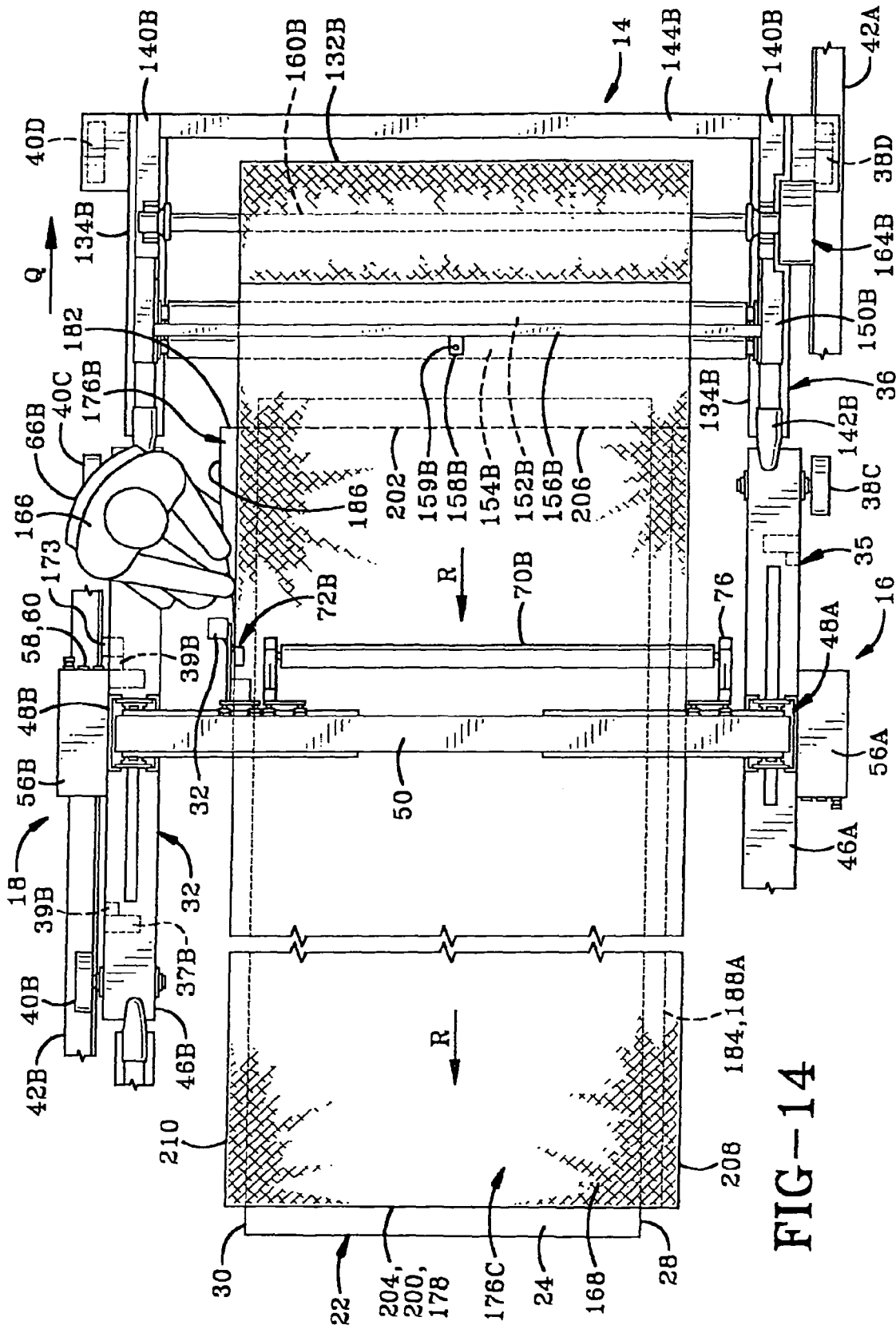
FIG. 14 is similar to FIG. 13 and shows the second welder welding the second and third sheet segments together as the machine moves in a direction opposite that during the welding of the first and second sheet segments together.
Figure 15:
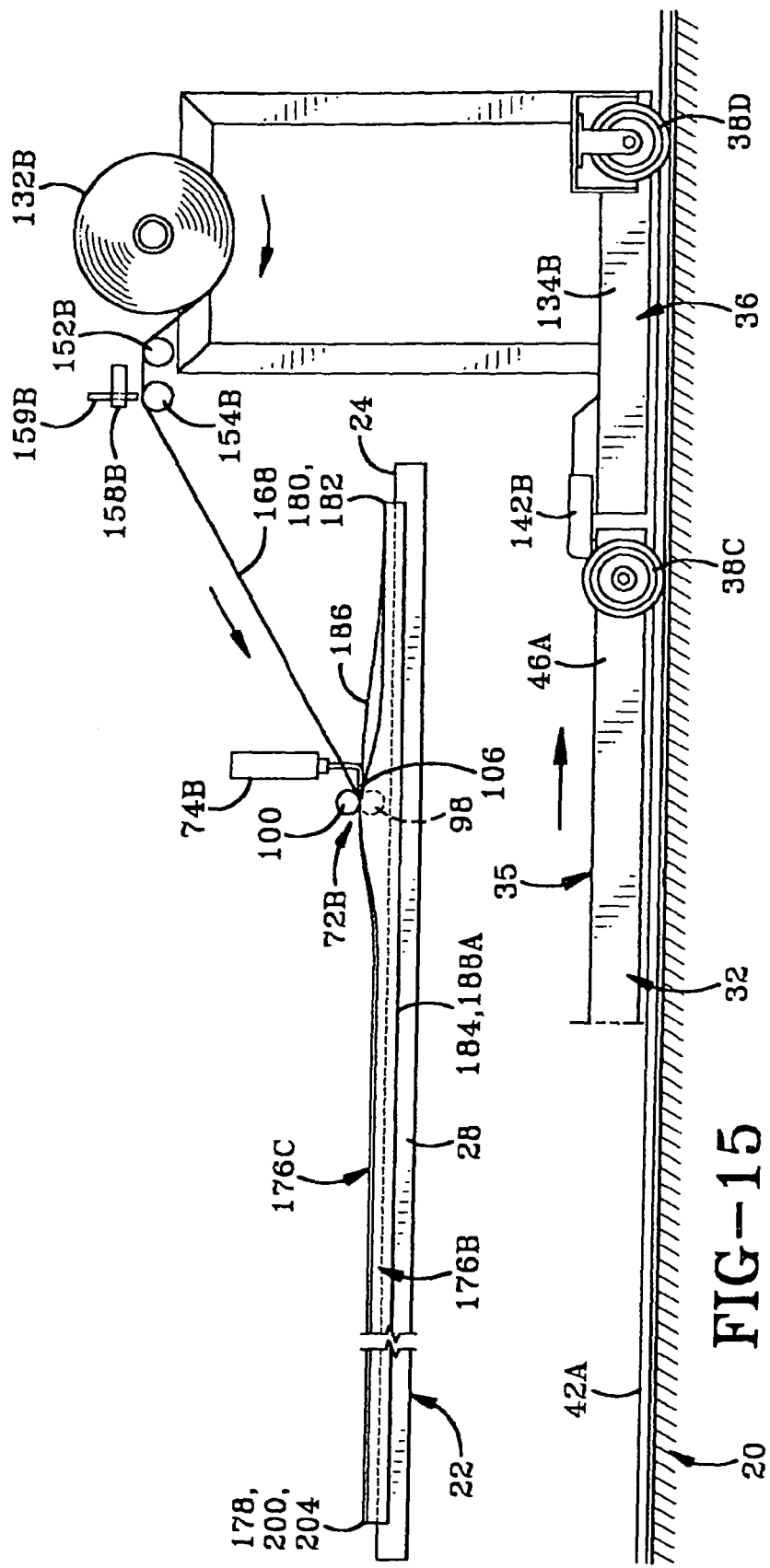
FIG. 15 is side elevational view with portions cut away of the operation shown in FIG. 14.
Figure 16:
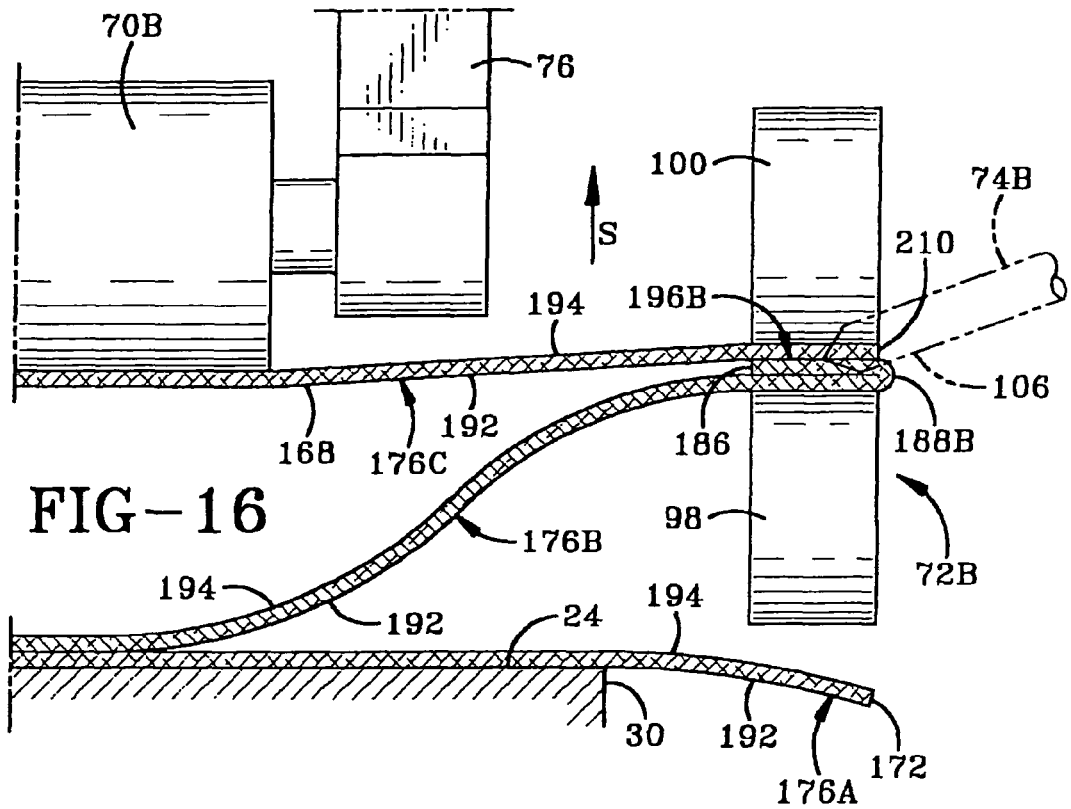
FIG. 16 is a sectional view taken on line 16-16 showing the welding of the second and third sheet segments together with an edge of the first sheet segment hanging over the edge of the table.

At this point operator 166 vacates chair 66A, walks from first side 16 to second side 18 of machine 10 and sits down in chair 66B. Once seated in chair 66B, operator 166 manipulates the controls of box 56B to undertake a second stage of welding, this time along edge 186 of second sheet segment 176B instead of along edge 184. FIGS. 13, 14 and 15 are analogous to FIGS. 7, 11 and 12, but show the welding operation performed in the opposite direction with sheet material 168 unwinding from roll 132B as sheet material 168 is guided by guide roller 70B between the pinch rollers of set 72B and operator 166 folds the material of sheet segment 176B along edge 186 to properly align the folded material with welder 74B and between the pinch rollers of set 72B. Thus, FIG. 13 shows the initial alignment of the folded material as it is unwound from roll 132B (Arrow P), FIG. 14 shows carriage 35 moving in the direction shown at Arrow Q as material 168 continues to unwind (Arrows R) from roll 132B and is cut at cut line 202 to form a third sheet segment 176C having first and second ends 204 and 206 respectively aligned with and overlaying ends 200 and 182 of second sheet segment 176B. Third sheet segment 176C has first and second edges 208 and 210. First edge 208 overhangs first edge 28 of table top 24 as well as the respective edges along fold 188A. As shown in FIG. 16, the material of sheet segment 176B adjacent edge 186 is folded over as previously described to form a second fold 188B as the second stage of welding continues until a weld seam 196B extends along the entire length of first and second sheet segments 176B and 176C opposite and parallel to weld 196A.

Figure 17:
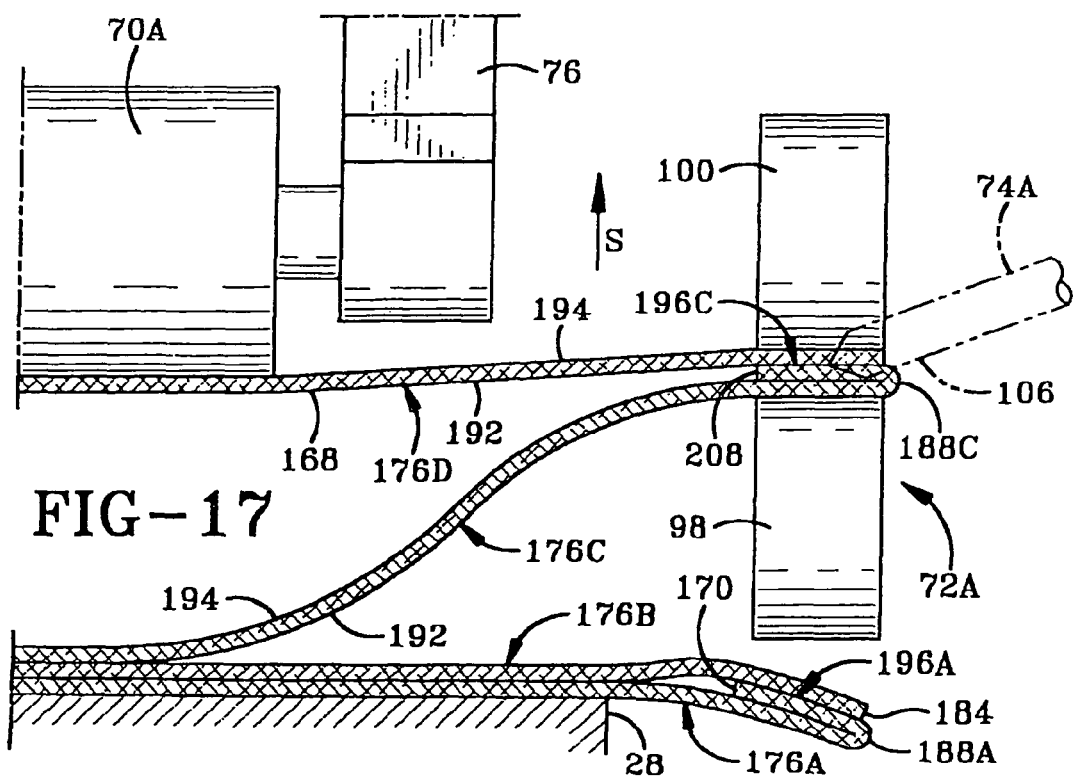
FIG. 17 is similar to FIG. 16 except that it shows the other weld head from the opposite side of the table from that shown in FIG. 16 welding the third and fourth sheet segments together and the first weld seam between the first and second sheets hanging over the edge of the table.
Figure 18:
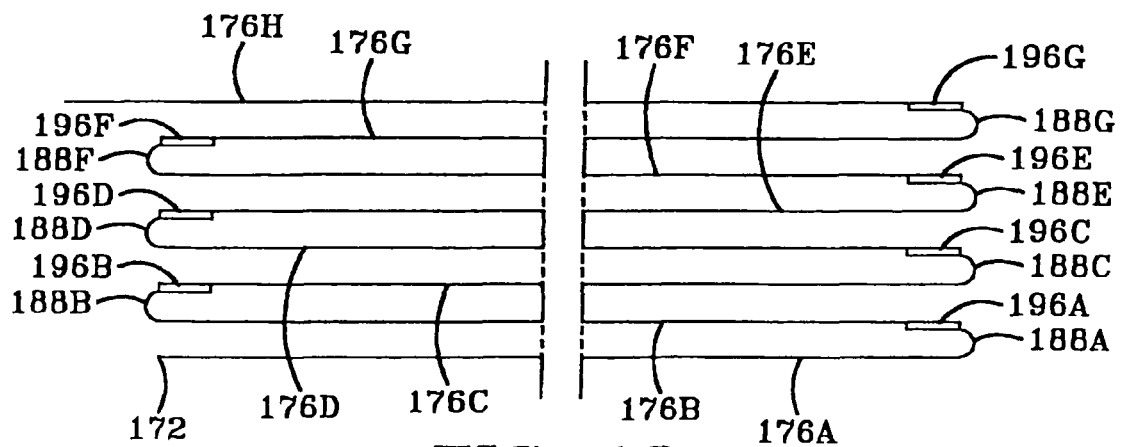
FIG. 18 is a diagrammatic end view of the welded sheet material showing eight sheet segments welded together and folded back and forth on one another after the formation of three weld seams along one side of the piled up sheet material and four weld seams along the other side of the material.

Once the second stage of welding is complete, operator 166 again vacates chair 66B, walks around the machine and sits in chair 66A to undergo a third stage of welding which is the repeat of that described with respect to the formation of weld seam 196A except that this occurs between a fourth sheet segment 176D (FIG. 17) and third sheet segment 176C. This produces another weld seam 196C extending along the entire length of the third and fourth sheet segments 176C and 176D which is parallel to and above weld 196A while the newly formed four-segment sheet is in a folded state on table 22. As seen in FIGS. 16 and 17, the weld seams and edges of the various sheet segments 176 overhang table top 24 and gradually the sheet segments 176 pile up atop one another to form a welded sheet of this series of sheet segments 176. This welding process continues in a sequential manner until multiple sheet segments are welded together as indicated in FIG. 18 by sheet segments 176A-H, with the respective weld seams being shown at 196A-G and the respective folds being shown at 188A-G. As these sheet segments pile up, they begin to form a substantial thickness so that welders 74 and the related structure may need to be moved up in order to suitably continue welding additional sheet segments together. This upward movement is indicated at Arrows S and FIGS. 16 and 17 and is accomplished by the operation of the lift mechanisms previously discussed with reference to FIG. 4. This lifting movement or height adjustment may be achieved whenever necessary.

The resulting multi-segment sheet as shown in FIG. 18 is conveniently stacked atop table top 24 or other work surface and is already in a folded state which is much easier to handle or further fold than with prior art methods in which the tarps are typically pulled off of a table onto a floor and must be ultimately spread out over a large area in order to fold them or roll them to a suitable storage and shipping size. The present process is useful for forming multi-segment sheets which may be used for the various purposes previously discussed. These sheets may easily be up to several hundred feet long and several hundred feet wide. When the multi-segment sheet is unfolded and stretched out, it includes multiple sheet segments 176 which are welded or otherwise seamed together along their edges by seams 196 which are spaced apart and parallel to one another and typically of substantially the same length.

Figure 19A:
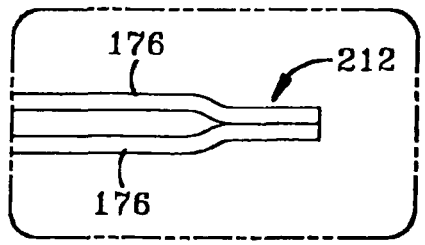
FIGS. 19A-F are diagrammatic views showing alternate types of seams that may be formed with the apparatus and method of the present invention.
Figure 19D:
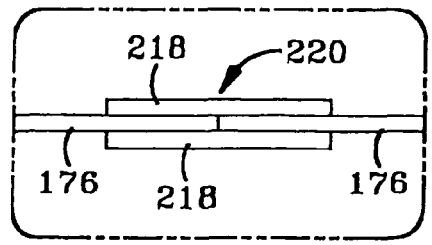
Figure 19B:
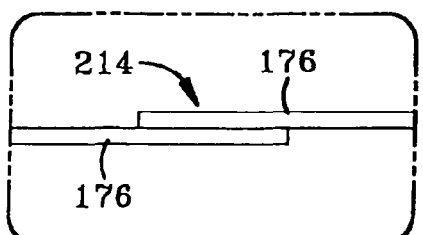
Figure 19E:
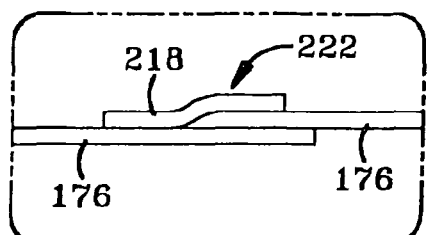
Figure 19C:
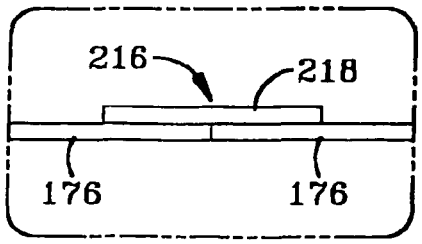
Figure 19F:
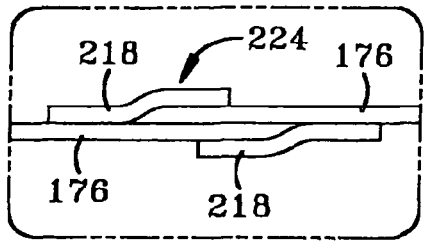

As previously noted, machine 10 may be configured with various types of seaming devices other than plastic welders in order to form various types of seams. As previously noted, seams 188 are known as folded lap seams or fold-over lap seals. FIGS. 19A-F show some examples of other types of seams which may be formed by the present apparatus and method. FIG. 19A shows a pair of sheet segments 176 connected by a fin seam or seal 212. FIG. 19B shows a pair of sheet segments 176 connected by an overlap seam or seal 214. FIG. 19C shows a seal 216 in which the edges of two-sheet segments 176 abut one another and a strip or tape 218 is connected to each sheet 176 along the abutting edges therebetween. Seal 216 is known as a butt seal with tape on one side. FIG. 19D shows a seal 220 which is similar to seal 216 except that it uses strips or tapes 218 on both sides and is generally known as a butt seal with tape on two sides. FIG. 19E shows a seal 222 which utilizes a strip or tape 218 and is known as a lap seal with a cover strip. FIG. 19F shows a seal 224 similar to seal 222 and using two strips 218 and thus is known as a lap seal with cover strips on two sides.

As previously noted, machine 10 may be used to form seams between a great variety of types of sheet materials. When the seaming device is a plastic welder, the sheet material may either be formed entirely by thermoplastic material or may include a thermoplastic material as one component. Often, this involves the use of a fabric which is laminated with a thermoplastic material. Amongst these thermoplastic materials are vinyls such as polyvinyl chloride (PVC), polyurethane, polypropylene, polyethylene, and so forth. In addition, thermoplastic rubber (TPR) may be plastic welded. Various other types of seaming devices as previously noted may also be used to form similar sorts of seams. In addition to thermal welding between layers of sheet material, various adhesives may be used in forming the seam. Some adhesives which may be used are thermally activated or cured. Thus, an adhesive strip is positioned between the edges of two segments of sheet material to be seamed together and heated so that the adhesive forms a suitable bond between the segments of sheet material. In addition, glues may be used in a similar fashion. Segments of sheet material may also be sewn together as well as previously discussed. Thus, the types of sheet materials used include woven material, non-woven material and sheet material which may or may not include thermoplastic material.

Figure 20:
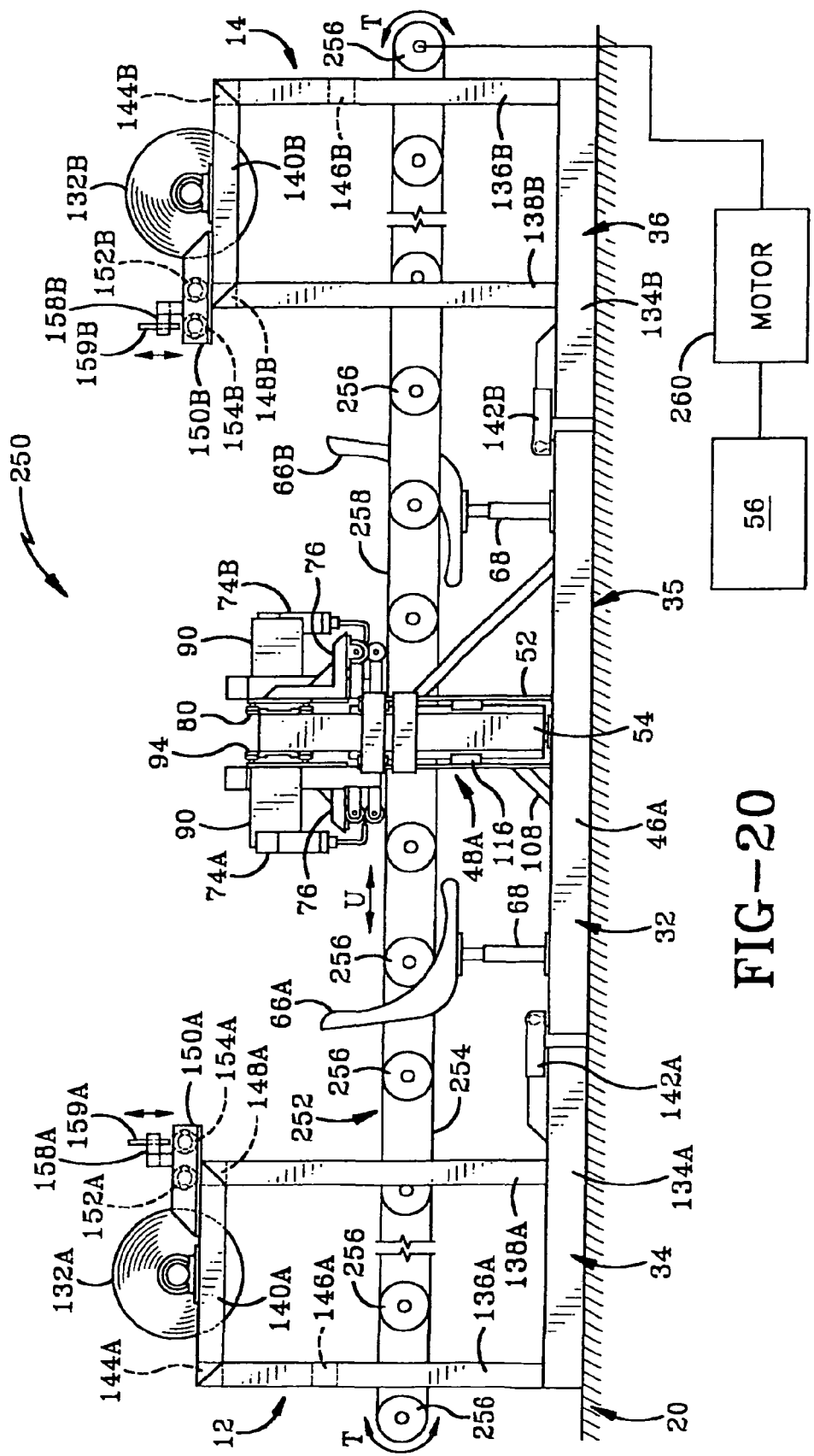
FIG. 20 is a side elevational view similar to FIG. 1 showing a second embodiment of the seaming machine with a conveyor belt assembly providing a moveable work surface.

Referring to FIG. 20, machine 250 is now described. Seaming machine 250 is similar to machine 10 except that it does not include wheels and is thus stationary. As noted with regard to machine 10, a table having wheels may be used in order to produce the relative movement between the work surface and the machine. Along these lines, machine 250 is used with a conveyer assembly 252 which includes a conveyer belt 254 which is mounted to revolve around a plurality of rollers 256 (Arrows T) so that a work surface 258 on a top portion of belt 254 can be moved longitudinally back and forth (Arrow U) to provide the relative movement between work surface 258 and machine 250. A motor 260 is operatively connected to one of rollers 256 for driving the revolution of belt 254 and is in electrical communication with each of boxes 56 so that it may be controlled by operator 166. During operation, belt 254 is revolved so that work surface 256 moves longitudinally in the same direction as the sheet material 168 unwinding from a given one of rolls 132. Although the use of a conveyer assembly such as assembly 252 may add to the cost of operation, it may be suitable for certain purposes.

Thus, machines 10 and 250 each provide an apparatus and process for producing a multi-segment seamed sheet which is substantially more efficient then the known prior art methods. Machines 10 and 250 can be operated by a single operator whereas the prior processes often involved four or more people in order to manipulate the various sheet segments during the process. The use of machine 10 or 250 thus substantially reduces the number of man hours needed to produce the final product. Machines 10 and 250 also overcome the various other problems addressed in the Background section of the present application.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A seaming machine for use with segments of sheet material each having first and second opposed edges, the machine comprising:
    a frame having first and second ends defining therebetween a longitudinal direction and first and second sides defining therebetween an axial direction;
    a sheet-receiving area within the frame having first and second axially spaced sides;
    first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; and
    first and second axially spaced operator supports on the frame respectively adjacent the first and second sides of the sheet-receiving area.

2. The machine of claim 1 wherein the first and second operator supports respectively comprise first and second operator seats mounted on the frame.

3. The machine of claim 1 further comprising first and second electronic control boxes mounted on the frame respectively adjacent the first and second operator supports.

4. The machine of claim 1 further comprising first and second sets of pinch rollers mounted on the frame respectively adjacent the first and second seaming devices.

5. The machine of claim 4 further comprising first and second guide rollers mounted on the frame respectively adjacent the first and second sets of pinch rollers.

6. The machine of claim 1 further comprising first and second longitudinally spaced spools on the frame adapted to respectively carry first and second rolls of sheet material; and wherein the seaming devices are longitudinally intermediate the spools.

7. A seaming machine for use with segments of sheet material each having first and second opposed edges, the machine comprising:
    a frame having first and second ends defining therebetween a longitudinal direction and first and second sides defining therebetween an axial direction;
    a sheet-receiving area within the frame having first and second axially spaced sides;
    first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; and
    first and second electronic control boxes mounted on the frame respectively adjacent the first and second sides of the sheet-receiving space and in electrical communication respectively with the first and second seaming devices.

8. A seaming machine for use with segments of sheet material each having first and second opposed edges, the machine comprising:
    a frame having first and second ends defining therebetween a longitudinal direction and first and second sides defining therebetween an axial direction;
    a sheet-receiving area within the frame having first and second axially spaced sides;
    first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments;

and the second seaming device adapted for seaming a third one of the segments of sheet material to the second segment along the second edges of the second and third segments;
first and second longitudinally spaced spools on the frame adapted to respectively carry first and second rolls of sheet material;
wherein the seaming devices are longitudinally intermediate the spools; and further comprising
first and second support rollers respectively adjacent the first and second spools.

9. The machine of claim 8 wherein the spools are rotatably mounted on the frame; and further comprising first and second spool feed controls respectively operatively connected to the first and second spools for controlling rotation of the spools.

10. A seaming machine for use with segments of sheet material each having first and second opposed edges, the machine comprising:
a frame having first and second ends defining therebetween a longitudinal direction and first and second sides defining therebetween an axial direction;
a sheet-receiving area within the frame having first and second axially spaced sides;
first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; and
an adjustment mechanism operatively connected to at least one of the seaming devices for axially adjusting the at least one seaming device.

11. A seaming machine for use with segments of sheet material each having first and second opposed edges, the machine comprising:
a frame having first and second ends defining therebetween a longitudinal direction and first and second sides defining therebetween an axial direction;
a sheet-receiving area within the frame having first and second axially spaced sides; and
first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; wherein the frame is movable back and forth in the longitudinal direction.

12. The machine of claim 11 further comprising a plurality of wheels mounted on the frame to facilitate the back and forth movement of the frame.

13. The machine of claim 11 further comprising a drive mechanism for driving the back and forth movement of the frame.

14. The machine of claim 13 further comprising a pathway along which the frame is movable back and forth in the longitudinal direction; first and second switch activators securable at respective positions adjacent the pathway; and first and second cutoff switches mounted on the frame and respectively engageable with the first and second switch activators to stop operation of the drive mechanism.

15. The machine of claim 11 further comprising first and second axially spaced side sections on the frame respectively defining the first and second sides of the sheet-receiving space; and an elevated section on the frame connected to and extending between the side sections over the sheet-receiving space; and wherein the seaming devices are mounted on the elevated section.

16. A seaming machine for use with segments of sheet material each having first and second opposed edges, the machine comprising:
a frame having first and second ends defining therebetween a longitudinal direction and first and second sides defining therebetween an axial direction;
a sheet-receiving area within the frame having first and second axially spaced sides;
first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; and
a height adjustment mechanism operatively connected to the first and second seaming devices for adjusting the height of the seaming devices.

17. A seaming machine for use with segments of sheet material each having first and second opposed edges, the machine comprising:
a frame having first and second ends defining therebetween a longitudinal direction and first and second sides defining therebetween an axial direction;
a sheet-receiving area within the frame having first and second axially spaced sides;
first and second axially spaced seaming devices on the frame respectively adjacent the first and second sides of the sheet-receiving area; the first seaming device adapted for seaming a first one of the segments of sheet material to a second one of the segments of sheet material along the first edges of the first and second segments; and the second seaming device adapted for seaming a third one of the segments of sheet material to the second segment along the second edges of the second and third segments; and
a work surface defining a lower boundary of the sheet-receiving area; and wherein one of the work surface and frame is movable back and forth in the longitudinal direction relative to the other of the work surface and frame.

18. In combination, a first roll of a first sheet material, a second roll of a second sheet material and a seaming machine comprising:
a frame having first and second ends defining therebetween a longitudinal direction and first and second sides defining therebetween an axial direction;
first and second axially elongated parallel spools on the frame longitudinally spaced from one another and adapted to respectively carrying the first and second rolls of sheet material; and
first and second seaming devices on the frame axially spaced from one another and longitudinally intermediate the spools;

a first segment of the first sheet material unwound from the first roll; and a second segment of the second sheet material unwound from the second roll atop the first segment.

19. The combination of claim 18 wherein
the first segment has first and second edges;
the second segment has first and second edges;
the first seaming device is adjacent the first edges of the first and second segments; and
the second seaming device is adjacent the second edges of the first and second segments.

20. The combination of claim 19 wherein
the first segment has a first end which extends from the first edge thereof to the second edge thereof;
the second segment has a first end which extends from the first edge thereof to the second edge thereof and which is adjacent the first end of the first segment.

21. The combination of claim 20 wherein
the first segment has a second end which extends from the first edge thereof to the second edge thereof;
the second segment has a second end which extends from the first edge thereof to the second edge thereof and which is adjacent the second end of the first segment.

22. The combination of claim 18 further comprising a seam between the first and second segments adjacent the first seaming device.

23. A method comprising the steps of:
positioning a first segment of sheet material having non-seamed first and second opposed edges on a generally horizontal work surface;
positioning a second segment of sheet material having non-seamed first and second opposed edges over the first segment with the first and second edges of the second segment respectively adjacent the first and second edges of the first segment;
seaming the first and second sheet segments together to create a first seam along the first edges of the first and second segments to form a two-segment sheet;
positioning a third segment of sheet material having non-seamed first and second opposed edges over the two-segment sheet with the first and second edges of the third segment respectively adjacent the first and second edges of the second segment and respectively adjacent the first and second edges of the first segment; and
seaming the second and third sheet segments together to create a second seam along the second edges of the second and third segments to form a folded three-segment sheet wherein the first, second and third segments are folded back and forth on one another so that the second seam is parallel to and above the non-seamed second edge of the first segment.

24. The method of claim 23 wherein the step of positioning the third segment over the two-segment sheet is performed after the step of seaming the first and second segments to form the two-segment sheet.

25. The method of claim 23 wherein the non-seamed first edge of the third segment is parallel to and above the first seam of the folded three-segment sheet.

26. The method of claim 23 wherein
the step of seaming the first and second sheet segments together comprises seaming the first and second sheet segments together with a first seaming device;
the step of seaming the second and third sheet segments together comprises seaming the second and third sheet segments together with a second seaming device which is axially spaced from the first seaming device;
the step of positioning the first segment comprises unwinding the first segment from a first roll of sheet material carried by a first axially elongated spool; and
the step of positioning the second segment comprises unwinding the second segment from a second roll of sheet material carried by a second axially elongated spool which is parallel to and longitudinally spaced from the first spool so that the first and second seaming devices are longitudinally intermediate the spools.

27. The method of claim 23 wherein
the step of positioning the first segment comprises unwinding the first segment from a first roll of sheet material carried by a first axially elongated spool while creating relative longitudinal movement between the first spool and work surface in a first direction; and
the step of positioning the second segment comprises unwinding the second segment from a second roll of sheet material carried by a second axially elongated spool while creating relative longitudinal movement between the second spool and work surface in a second direction opposite the first direction.

28. The method of claim 23 further comprising the steps of positioning a fourth segment of sheet material having non-seamed first and second opposed edges over the folded three-segment sheet with the first and second edges of the fourth segment respectively adjacent the first and second edges of the third segment, respectively adjacent the first and second edges of the second segment and respectively adjacent the first and second edges of the first segment; and
seaming the third and fourth sheet segments together to create a third seam along the first edges of the third and fourth segments to form a folded four-segment sheet in which the first, second, third and fourth segments are folded back and forth on one another so that the third seam is parallel to and above the first seam.

29. The method of claim 23 wherein
the first, second and third segments have respective first and second opposed ends;
the step of positioning the second segment comprises positioning the second segment so that the first and second ends of the second segment are adjacent the first and second ends of the first segment;
the step of positioning the third segment comprises positioning the third segment so that the first and second ends of the third segment are respectively adjacent the first and second ends of the second segment and respectively adjacent the first and second ends of the first segment;
the step of seaming the first and second sheet segments together to create the first seam comprises seaming the first and second sheet segments together beginning adjacent the first ends of the first and second segments and finishing adjacent the second ends of the first and second segments; and
the step of seaming the second and third segments together to create the second seam comprises seaming the second and third segments together beginning adjacent the second ends of the second and third sheet segments and finishing adjacent the first ends of the second and third sheet segments.

30. The method of claim 23 wherein
the step of seaming the first and second sheet segments together comprises seaming the first and second sheet segments together with a first seaming device while moving one of the work surface and first seaming device longitudinally in a first direction relative to the other of the work surface and first seaming device; and the step of seaming the second and third sheet segments together comprises seaming the second and third sheet segments together with a second seaming device while moving one of the work surface and second seaming device longitudinally in a second opposed direction relative to the other of the work surface and second seaming device.

31. A method comprising the steps of:

positioning a first segment of sheet material having first and second opposed edges on a generally horizontal work surface;

positioning a second segment of sheet material having first and second opposed edges over the first segment;

positioning a third segment of sheet material having first and second opposed edges over the first and second segments;

positioning a fourth segment of sheet material having first and second opposed edges over the first, second and third segments with the first and second edges of the fourth segment respectively adjacent the first and second edges of the third segment, respectively adjacent the first and second edges of the second segment and respectively adjacent the first and second edges of the first segment;

seaming the first and second segments together to create a first seam along the first edges of the first and second segments;

seaming the second and third sheet segments together to create a second seam along the second edges of the second and third segments;

seaming the third and fourth segments together to create a third seam along the first edges of the third and fourth segments to form a folded four-segment sheet which is unfoldable so that the first, second and third seams are parallel and spaced apart from one another.

32. The method of claim 31 wherein the step of seaming the first and second segments together comprises seaming the first and second segments together with a first seaming device;

the step of seaming the second and third segments together comprises seaming the second and third segments together with a second seaming device;

the step of seaming the third and fourth segments together comprises seaming the third and fourth segments together with the first seaming device.

33. The method of claim 31 wherein the step of seaming the first and second segments together comprises seaming the first and second segments together with a first seaming device while moving one of the work surface and first seaming device longitudinally in a first direction relative to the other of the work surface and first seaming device; and the step of seaming the second and third segments together comprises seaming the second and third segments together with a second seaming device while moving one of the work surface and second seaming device longitudinally in a second opposed direction relative to the other of the work surface and second seaming device.

* * * * *